(12) United States Patent
Horiuchi et al.

(10) Patent No.: US 9,313,777 B2
(45) Date of Patent: Apr. 12, 2016

(54) TRANSMISSION DEVICE, RECEPTION DEVICE, TRANSMISSION METHOD, AND RECEPTION METHOD

(75) Inventors: Ayako Horiuchi, Kanagawa (JP); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 129 days.

(21) Appl. No.: 14/122,585

(22) PCT Filed: Jul. 27, 2012

(86) PCT No.: PCT/JP2012/004786
§ 371 (c)(1),
(2), (4) Date: Nov. 26, 2013

(87) PCT Pub. No.: WO2013/024569
PCT Pub. Date: Feb. 21, 2013

(65) Prior Publication Data
US 2014/0098775 A1   Apr. 10, 2014

(30) Foreign Application Priority Data
Aug. 12, 2011   (JP) .................................. 2011-176855

(51) Int. Cl.
*H04W 72/04*    (2009.01)
*H04L 5/00*     (2006.01)
*H04L 1/00*     (2006.01)

(52) U.S. Cl.
CPC ......... *H04W 72/0406* (2013.01); *H04L 1/0006* (2013.01); *H04L 1/0046* (2013.01); *H04L 5/0053* (2013.01); *H04W 72/0453* (2013.01)

(58) Field of Classification Search
CPC .................................................. H04W 72/0406
See application file for complete search history.

(56) References Cited

U.S. PATENT DOCUMENTS

2009/0168922 A1 *  7/2009  Malladi et al. ................ 375/316
2011/0194524 A1 *  8/2011  Hedlund et al. .............. 370/329
(Continued)

FOREIGN PATENT DOCUMENTS

WO    2010/151093 A2    12/2010

OTHER PUBLICATIONS

Extended European Search Report dated Jan. 8, 2015, for corresponding EP Application No. 12824546.1-1851 / 2704506, 10 pages.
(Continued)

*Primary Examiner* — Brian D Nguyen
*Assistant Examiner* — Toan Nguyen
(74) *Attorney, Agent, or Firm* — Seed IP Law Group PLLC

(57) ABSTRACT

In a base station (100), a division number calculating unit (103) calculates the division number of a PRB pair on the basis of a first number of REs capable of mapping an allocation control signal, a second number of REs capable of mapping signals other than the allocation control signal, and a reference value, which is the number of REs satisfying the reception quality request in a terminal (200) for the allocation control signal, in each PRB pair. Then, a control signal mapping control unit (104) determines a search space by determining a control channel element group constituting a plurality of mapping unit resource region candidates within a CCE group obtained by separating each PRB pair contained in a first group into the same number as the division number.

10 Claims, 18 Drawing Sheets

(56) References Cited

U.S. PATENT DOCUMENTS

2011/0268032 A1* 11/2011 Kim et al. .................... 370/328
2011/0292846 A1* 12/2011 Hu et al. ....................... 370/280
2012/0046032 A1* 2/2012 Baldemair et al. ............ 455/434
2012/0099518 A1 4/2012 Park et al.

OTHER PUBLICATIONS

NTT Docomo, "DL Control Channel Enhancement for DL MIMO in Rel-11," R1-111636, 3GPP TSG RAN WG1 Meeting #65, Agenda Item: 6.3.2.2, Barcelona, Spain, May 9-13, 2011, 6 pages.
Samsung, "PDCCH Extension for ICIC and Capacity Gains," R1-103046, 3GPP TSG RAN WG1 #61, Agenda Item: 6.8, Montreal, Canada, May 10-14, 2010, 2 pages.
3GPP TS 36.216 V10.1.0, "3rd Generation partnership Project' Technical Specification Group Radio Access Network; Evolved Universal Terrestrial Radio Access (U-UTRA); Physical layer for relaying operation (Release 10)," Dec. 2010, 15 pages.
Panasonic, "R-PDCCH search space design," R1-105498, 3GPP TSG RAN WG1 Meeting #62bis, Agenda Item: 6.6.1 R-PDCCH search space design, Xi'An China, Oct. 11-15, 2010, 5 pages.
LG Electronics, "Remaining Details in Non-Interleaving R-PDCCH Transmission," R1-106135, 3GPP TSG RAN WG1 Meeting #63, Agenda Item: 6.6.1, Jacksonville, USA, Nov. 15-19, 2010, 7 pages.
Etri, "Remaining details of non-interleaving R-PDCCH search space," R1-106169, 3GPP TSG RAN WG1 Meeting #63, Agenda Item: 6.61, Jacksonville, USA, Nov. 15-19, 2010, pp. 1-4.
International Search Report dated Aug. 21, 2012, for corresponding International Application No. PCT/JP2012/004786, 3 pages.

* cited by examiner

FIG. 6 (PRIOR ART)

| | | 1st slot | | | | | | 2nd slot | | | | | |
| | | Normal CP | | | Extended CP | | | Normal CP | | | Extended CP | | |
| | CRS | DMRS | insertion REs | REs | DMRS | insertion REs | REs | DMRS | insertion REs | REs | DMRS | insertion REs | REs |
|---|---|---|---|---|---|---|---|---|---|---|---|---|---|
| CSI-RS 0 | Port0 | | 2 | 46 | | 2 | 34 | | 4 | 80 | | 4 | 68 |
| | Port0, 1 | | 4 | 44 | | 4 | 32 | | 8 | 76 | | 8 | 64 |
| | Port0, 1, 2, 3, 4 | | 4 | 44 | | 4 | 32 | | 12 | 72 | | 12 | 60 |
| | | 12REs | 6 | 42 | 16REs | 8 | 28 | 12REs | 6 | 78 | 16REs | 8 | 64 |
| | | 24REs | 12 | 36 | | | | 24REs | 12 | 72 | | | |
| | Port0 | 12REs | 8 | 40 | 16REs | 10 | 26 | 12REs | 10 | 74 | 16REs | 12 | 60 |
| | Port0, 1 | 24REs | 14 | 34 | | | | 24REs | 16 | 68 | | | |
| | Port0, 1 | 12REs | 10 | 38 | 16REs | 12 | 24 | 12REs | 14 | 70 | 16REs | 16 | 56 |
| | Port0, 1 | 24REs | 16 | 32 | | | | 24REs | 20 | 64 | | | |
| | Port0, 1, 2, 3, 4 | 12REs | 10 | 38 | 16REs | 12 | 24 | 12REs | 18 | 66 | 16REs | 20 | 52 |
| | Port0, 1, 2, 3, 4 | 24REs | 16 | 32 | | | | 24REs | 24 | 60 | | | |
| CSI-RS 2 | Port0 | | 4 | 44 | | 4 | 32 | | 6 | 78 | | 6 | 66 |
| | Port0, 1 | | 6 | 42 | | 6 | 30 | | 10 | 74 | | 10 | 62 |
| | Port0, 1, 2, 3, 4 | | 6 | 42 | | 8 | 30 | | 14 | 70 | | 14 | 58 |
| | | 12REs | 8 | 40 | 16REs | 10 | 26 | 12REs | 8 | 76 | 16REs | 10 | 62 |
| | | 24REs | 14 | 34 | | | | 24REs | 14 | 70 | | | |
| | Port0 | 12REs | 10 | 38 | 16REs | 12 | 24 | 12REs | 12 | 72 | 16REs | 14 | 58 |
| | Port0, 1 | 24REs | 16 | 32 | | | | 24REs | 18 | 66 | | | |
| | Port0, 1 | 12REs | 12 | 36 | 16REs | 14 | 22 | 12REs | 16 | 68 | 16REs | 18 | 54 |
| | Port0, 1 | 24REs | 18 | 30 | | | | 24REs | 22 | 62 | | | |
| | Port0, 1, 2, 3, 4 | 12REs | 12 | 36 | 16REs | 14 | 22 | 12REs | 20 | 64 | 16REs | 22 | 50 |

FIG. 7 (PRIOR ART)

TRANSMISSION DEVICE, RECEPTION DEVICE, TRANSMISSION METHOD, AND RECEPTION METHOD

TECHNICAL FIELD

The present invention relates to a transmission apparatus, a reception apparatus, a transmission method, and a reception method.

BACKGROUND ART

In recent years, it has become common to transmit not only audio data but also large-volume data, such as still image data and moving image data in addition to audio data in cellular mobile communication systems, in response to spread of multimedia information. Active studies associated with techniques for achieving a high transmission rate in a high-frequency radio band have been conducted to achieve large-volume data transmission.

When a high frequency radio band is utilized, however, attenuation increases as the transmission distance increases, although a higher transmission rate can be expected within a short range. Accordingly, the coverage area of a radio communication base station apparatus (hereinafter, abbreviated as "base station") decreases when a mobile communication system using a high frequency radio band is actually put into operation. Thus, more base stations need to be installed in this case. The installation of base stations involves reasonable costs, however. For this reason, there has been a high demand for a technique that provides a communication service using a high-frequency radio band while limiting an increase in the number of base stations.

In order to meet such a demand, studies have been carried out on a relay technique in which a radio communication relay station apparatus (hereinafter, abbreviated as "relay station") is installed between a base station and a radio communication mobile station apparatus (hereinafter, abbreviated as "mobile station") to perform communication between the base station and mobile station via the relay station for the purpose of increasing the coverage area of each base station. The use of relay technique allows a mobile station not capable of directly communicating with a base station to communicate with the base station via a relay station.

It is required for an LTE-A (long-term evolution advanced) system for which the introduction of the relay technique described above has been studied, to maintain compatibility with LTE (long-term evolution) in terms of a smooth transition from and coexistence with LTE. For this reason, mutual compatibility with LTE is required for the relay technique as well.

FIG. 1 illustrates example frames in which control signals and data are assigned in the LTE system and the LTE-A system.

In the LTE system, DL (downlink) control signals from a base station to a mobile station are transmitted through a DL control channel, such as PDCCH (physical downlink control channel). In LTE, DL grant (also referred to as "DL assignment") indicating DL data assignment and UL (uplink) grant indicating UL data assignment are transmitted through PDCCH. A DL grant indicates that a resource in the subframe in which the DL grant is transmitted has been allocated to the mobile station. Meanwhile, in an FDD system, a UL grant indicates that a resource in the fourth subframe after the subframe in which the UL grant is transmitted has been allocated to the mobile station. In a TDD system, a UL grant indicates that the resource in a subframe transmitted after four or more subframes from the subframe in which the UL grant is transmitted has been allocated to the mobile station. In the TDD system, the subframe to be assigned to the mobile station, or the number of subframes before the assigned subframe in which the UL grant is transmitted is determined in accordance with the time-division pattern of the UL and DL (hereinafter referred to as "UL/DL configuration pattern"). Regardless of the UL/DL configuration pattern, the UL subframe is a subframe after at least four subframes from the subframe in which the UL grant is transmitted.

In the LTE-A system, relay stations, in addition to base stations, also transmit control signals to mobile stations in PDCCH regions in the top parts of subframes. With reference to a relay station, DL control signals have to be transmitted to a mobile station. Thus, the relay station switches the processing to reception processing after transmitting the control signals to the mobile station to prepare for receiving signals transmitted from the base station. The base station, however, transmits DL control signals to the relay station at the time the relay station transmits the DL control signals to the mobile station. The relay station therefore cannot receive the DL control signals transmitted from the base station. In order to avoid such inconvenience in LTE-A, studies have been carried out on providing a region for mapping downlink control signals for relay stations (i.e., relay PDCCH (R-PDCCH) region) in a data region as illustrated in FIG. 2 in LTE-A. Similar to the PDCCH, mapping a DL grant and UL grant to the R-PDCCH is studied. In the R-PDCCH, as illustrated in FIG. 1, mapping a DL grant in the first slot and a UL grant in the second slot is studied (refer to Non-patent Literature 1). Mapping the DL grant only in the first slot reduces a delay in decoding the DL grant and allows relay stations to prepare for ACK/NACK transmission for DL data (transmitted in the fourth subframes following reception of DL grant in FDD). Each relay station finds the downlink control signals intended for the relay station by performing blind-decoding on downlink control signals transmitted using an R-PDCCH region from a base station within a resource region indicated using higher layer signaling from the base station (i.e., search space). As described above, the base station notifies the relay station of the search space corresponding to the R-PDCCH by higher layer signaling.

Given the introduction of various apparatuses as radio communication terminals in the future M2M (machine to machine) communication, for example, there is a concern for a shortage of resources in the mapping region for PDCCH (i.e., "PDCCH region") due to an increase in the number of terminals. If PDCCH cannot be mapped due to such a resource shortage, the DL data cannot be assigned for the terminals. Thus, the resource region for mapping DL data (i.e., "PDCCH (physical downlink shared channel) region") cannot be used even if there is an available region, which may cause a decrease in the system throughput. Studies have been carried out to solve such resource shortage through mapping control signals for terminals served by a base station also in a data region to which R-PDCCH is mapped. The resource region to which control signals for terminals served by the base station are mapped and which can be utilized as a data region at different timings is called an "enhanced PDCCH (E-PDCCH) region, "new-PDCCH (N-PDCCH) region" or "X-PDCCH region" or the like. As described above, in LTE-A, a relay technique is introduced and relay control signals are mapped to the data region. Since the relay control signal may be expanded and used as a control signal for a terminal, the resource region to which control signals for terminals served by the base station are mapped and which can be utilized as a data region at different timings is also called "R-PDCCH." Mapping the control signals (i.e., E-PDCCH) to a data region in such a manner enables transmission power control for control signals transmitted to terminals near a cell edge or interference control for interference to another cell by control signals to be transmitted or for interference to the cell from another cell. In LTE-Advance, a high transmission rate is achieved using a wideband radio bandwidth, multiple-input multiple-output (MIMO) transmission technique and interference control technique.

PDCCH and R-PDCCH have four aggregation levels, i.e., levels 1, 2, 4, and 8 (for example, refer to Non-patent Literature (hereinafter, abbreviated as "NPL") 1). Levels 1, 2, 4, and 8 respectively have six, six, two, and two "resource region candidates." The term "resource region candidate" refers to a candidate region to which control signals are to be mapped. Each resource region candidate is composed of as many control channel elements (CCE) as corresponding aggregation levels. In addition, when a single terminal is set with one aggregation level, control signals are actually mapped to one of the multiple resource region candidates of the aggregation level. FIG. 2 illustrates example search spaces corresponding to R-PDCCH. The ovals represent search spaces at various aggregation levels. The multiple resource region candidates in the search spaces at the different aggregation levels are arranged consecutively on VRBs (virtual resource blocks). The resource region candidates in the VRBs are mapped to PRBs (physical resource blocks) through higher layer signaling.

A search space corresponding to E-PDCCH is a resource region to which control signals transmitted from a base station to a terminal may be mapped. A search space corresponding to E-PDCCH is individually set for each terminal.

As described above, in the R-PDCCH region, a DL grant is mapped to the first slot and UL grant is mapped to the second slot. That is, the resource to which the DL grant is mapped is separated from the resource to which the UL grant is mapped in the time domain. In contrast, in E-PDCCH, as shown in FIG. 3, studies are also underway to separate the resource to which the DL grant is mapped from the resource to which the UL grant is mapped in the frequency domain (that is, subcarriers or PRB pair). Here, the term "PRB (physical resource block) pair" refers to a set of PRBs of the first slot and the second slot, whereas the term "PRB" refers to each of the PRBs of the first slot and the second slot.

For the design of E-PDCCH, part of the design of R-PDCCH may be used or a design completely different from the design of R-PDCCH may be used. Actually, studies are underway to make the design of E-PDCCH different from the design of R-PDCCH.

CITATION LIST

Non-Patent Literature

NPL 1
3GPP TS 36.216 V10.1.0 Physical layer for relaying operation

SUMMARY OF INVENTION

Technical Problem

When the resource to which a DL grant is mapped is separated from the resource to which a UL grant is mapped in the frequency domain (that is, subcarriers or RB pair), one PRB pair may be designated as a minimum unit (that is, a CCE) when resources are allocated to E-PDCCH. However, when a PRB pair made up of two slots is designated as a CCE, the resource amount of CCE increases. For this reason, a reception SINR of E-PDCCH increases and the possibility of receiving quality becoming excessively high, which results in an increased possibility of resources being wasted. Therefore, a "divided resource region" obtained by dividing one PRB pair may be used as a CCE of E-PDCCH.

However, when the division number per PRB pair increases, the resource amount of CCE for E-PDCCH (that is, the number of resource elements (REs) forming one CCE) decreases. Moreover, when the aggregation level of E-PDCCH is assumed to be 1, 2, 4 or 8 as in the cases of PDCCH and R-PDCCH, the number of terminals that can be supported decreases. That is, the receiving quality of terminals that can be supported is determined by the receiving quality of highest aggregation level 8. When the resource amount of CCE for E-PDCCH is small, the receiving quality of E-PDCCH degrades, and therefore the number of terminals that satisfy the desired receiving quality decreases.

Furthermore, even when the division number per PRB pair is fixed, the number of REs forming a CCE varies from one subframe to another. The following is the description of factors that cause the number of REs forming a CCE to vary from one subframe to another even when the division number per PRB pair is fixed. In LTE and LTE-A, one PRB has 12 subcarriers in the frequency direction and has a width of 0.5 msec in the time direction as shown in FIG. 4. A unit of two PRBs combined in the time direction is called a "PRB pair." That is, a PRB pair has 12 subcarriers in the frequency direction and has a width of 1 msec in the time direction. However, when a PRB pair represents a block of 12 subcarriers in the frequency domain, the PRB pair may be simply called "RB." In addition, a unit defined by one subcarrier and one OFDM symbol is a resource element (RE). The items described about PRBs here also apply to VRBs. The term "RB" is used to generically call a PRB and VRB.

[1] CP Length of OFDM Symbol:

The number of OFDM symbols per PRB varies depending on a CP (cyclic prefix) length of OFDM symbol. Therefore, the number of REs forming a CCE varies depending on the CP (cyclic prefix) length even if the division number per PRB pair is fixed.

To be more specific, a normal downlink subframe includes 14 OFDM symbols in the case of a normal CP and includes 12 OFDM symbols in the case of an extended CP. Furthermore, a DwPTS region of a special subframe shown in FIG. 5 (that is, region used for DL transmission) includes three, nine, ten, eleven or twelve OFDM symbols in the case of a normal CP and three, eight, nine or ten OFDM symbols in the case of an extended CP.

[2] Number of REs Used for Reference Signal (RS):

The number of REs to which reference signals are mapped in one PRB varies from one subframe to another. Therefore, the number of REs forming a CCE varies depending on the number of REs to which reference signals are mapped in one PRB even when the division number per PRB pair is fixed.

(1) CRS:

CRS is transmitted in all RBs. Although CRS is also transmitted in a data region in subframes other than MBSFN subframes, CRS is transmitted using only two initial OFDM symbols in MBSFN subframes.

(2) DMRS (12 REs, 24 REs or 16 REs):

The use of DMRS is dynamically indicated from a base station to a terminal using downlink assignment control information (DL assignment). The number of DMRSs to be set can be made to vary from one user to another. DMRS is transmitted in a data region and the value to be set may vary from one RB to another.

(3) CSI-RS (2 REs or More):

CSI-RS is transmitted in all RBs. A subframe to be transmitted is determined by a previously set period. CSI-RS has a muting function of not transmitting data in order to receive a CSI-RS of another cell. Once the CSI-RS muting is set, the number of REs usable as a data region or E-PDCCH region further decreases.

(4) PRS (Positioning Reference Signals):

PRS (positioning reference signals) is an RS used for position measurement. In such a setting that REs set for this PRS is not used for the E-PDCCH region, the number of REs available for E-PDCCH further decreases.

[3] Number of OFDM Symbols Forming PDCCH Region:

The number of OFDM symbols used for PDCCH is variable from one to four. Therefore, in such a setting that the PDCCH region is not used for E-PDCCH, the number of OFDM symbols available for E-PDCCH decreases as the number of OFDM symbols of the PDCCH region increases. That is, the number of REs forming a CCE varies depending on the number of OFDM symbols forming the PDCCH region even if the division number per PRB pair is fixed.

Figure 7:
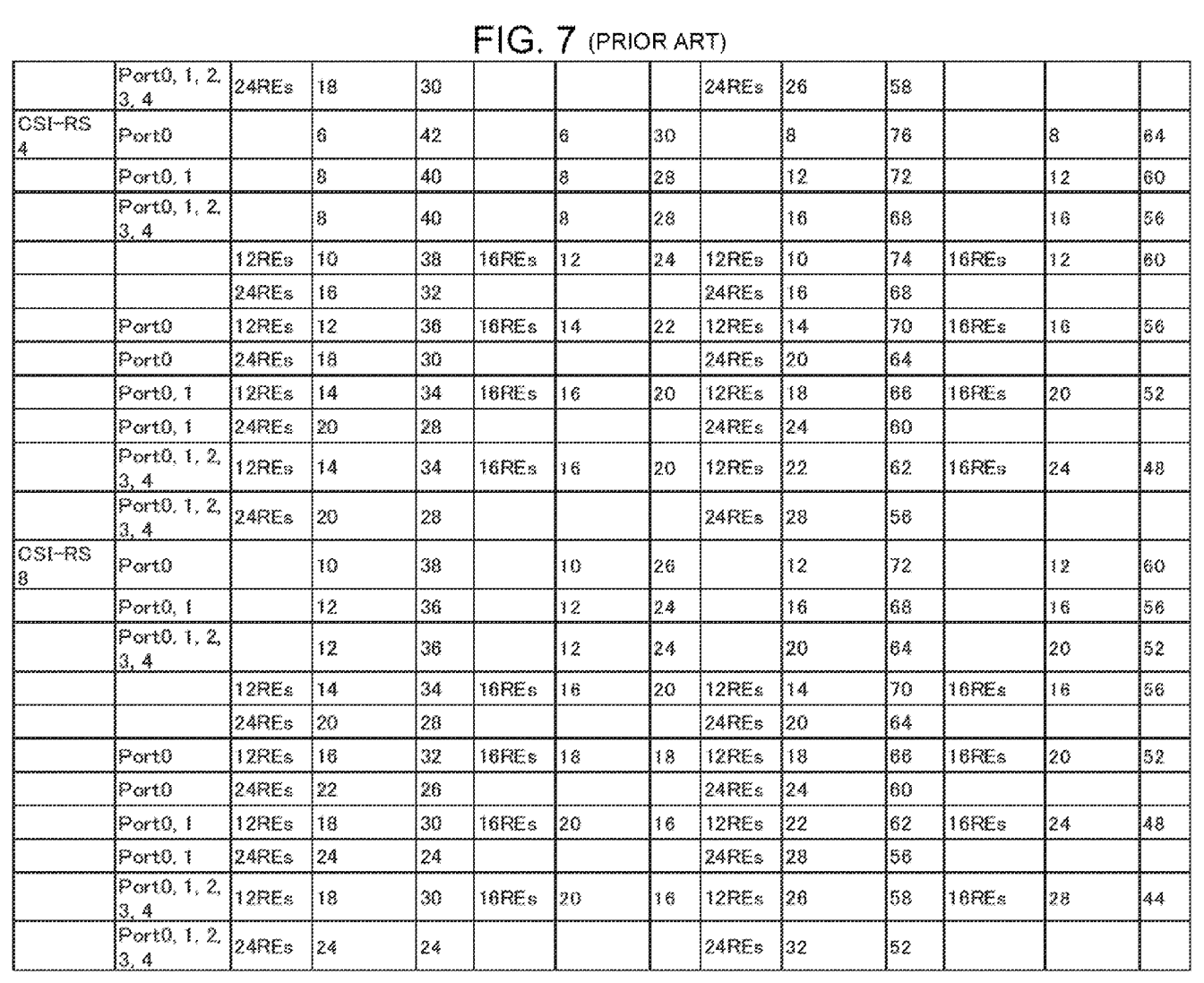

FIG. 6 and FIG. 7 illustrate the number of REs of the first slot and the second slot when resources of the fourth and subsequent OFDM symbols of the PRB pair are used for E-PDCCH. FIG. 6 and FIG. 7 illustrate an example where CSI-RS is mapped to the second slot in particular. FIG. 6 and FIG. 7 together form one table: FIG. 6 showing the first half of the table and FIG. 7 showing the second half of the table.

As described above, when the number of REs located in a PRB pair and available for E-PDCCH fluctuates considerably, receiving quality of a control signal is more likely to degrade.

An object of the present invention is to provide a transmitting apparatus, a receiving apparatus, a transmission method and a reception method that are capable of improving receiving quality of a control signal.

Solution to Problem

A transmitting apparatus according to an aspect of the present invention includes: a calculation section that calculates a division number of each one of physical channel resource blocks based on: a first number of resource elements in a corresponding one of the physical channel resource blocks to which resource elements an assignment control signal is capable of being mapped; a second number of resource elements to which a signal other than the assignment control signal is mapped; and a reference value which is a number of resource elements that satisfy receiving quality of the assignment control signal in a receiving apparatus; a control section that sets a resource region candidate including at least one control channel element obtained by dividing each one of the physical channel resource blocks into the division number and that determines, based on an aggregation level, a search space made up of a plurality of the resource region candidates set in each one of the physical channel resource blocks; and a transmitting section that transmits, to the receiving apparatus, the assignment control signal mapped in one of the plurality of resource region candidates forming the search space.

A receiving apparatus according to an aspect of the present invention includes: a calculation section that calculates a division number of each one of physical channel resource blocks based on: a first number of resource elements in a corresponding one of the physical channel resource blocks to which resource elements an assignment control signal is capable of being mapped; a second number of resource elements to which a signal other than the assignment control signal is mapped; and a reference value which is a number of resource elements that satisfy receiving quality of the assignment control signal in a receiving apparatus; an identification section that sets a resource region candidate including at least one control channel element obtained by dividing each one of the physical channel resource blocks into the division number and that identifies, based on an aggregation level, a search space made up of a plurality of the resource region candidates set in each one of the physical channel resource blocks; and a receiving section that receives the assignment control signal mapped in one of the plurality of resource region candidates forming the identified search space.

A transmission method according to an aspect of the present invention includes: calculating a division number of each one of physical channel resource blocks based on: a first number of resource elements in a corresponding one of the physical channel resource blocks to which resource elements an assignment control signal is capable of being mapped; a second number of resource elements to which a signal other than the assignment control signal is mapped; and a reference value which is the number of resource elements that satisfy receiving quality of the assignment control signal in a receiving apparatus; setting a resource region candidate including at least one control channel element obtained by dividing each one of the physical channel resource blocks into the division number; determining, based on an aggregation level, a search space made up of a plurality of the resource region candidates set in each one of the physical channel resource blocks; and transmitting, to the receiving apparatus, the assignment control signal mapped in one of the plurality of resource region candidates forming the search space.

A reception method according to an aspect of the present invention includes: calculating a division number of each one of physical channel resource blocks based on: a first number of resource elements in a corresponding one of the physical channel resource blocks to which resource elements an assignment control signal is capable of being mapped; a second number of resource elements to which a signal other than the assignment control signal is mapped; and a reference value which is the number of resource elements that satisfy receiving quality of the assignment control signal; setting a resource region candidate including at least one control channel element obtained by dividing each one of the physical channel resource blocks into the division number; identifying, based on an aggregation level, a search space made up of a plurality of the resource region candidates set in each one of the physical channel resource blocks; and receiving the assignment control signal mapped in one of the plurality of resource region candidates forming the identified search space.

Advantageous Effects of Invention

According to the present invention, it is possible to provide a transmitting apparatus, a receiving apparatus, a transmission method and a reception method that are capable of improving receiving quality of a control signal.

BRIEF DESCRIPTION OF DRAWINGS

FIG. 6 illustrates the number of REs of a first slot and a second slot when resources of the fourth and subsequent OFDM symbols of a PRB pair are used for E-PDCCH;

FIG. 7 illustrates the number of REs of a first slot and a second slot when resources of the fourth and subsequent OFDM symbols of a PRB pair are used for E-PDCCH;

DESCRIPTION OF EMBODIMENTS

Figure 1:
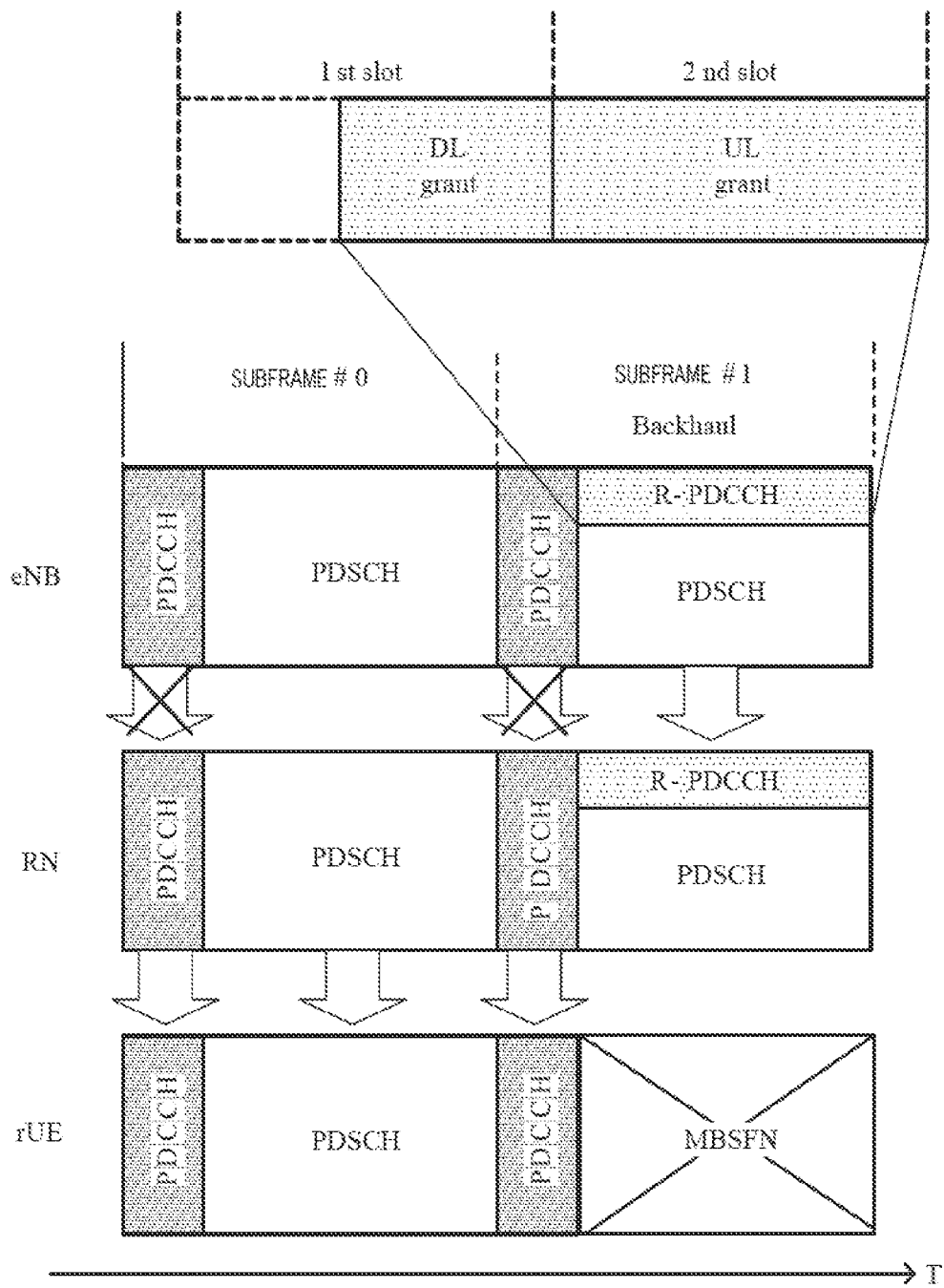
FIG. 1 illustrates example frames containing control signals and data assigned thereto, in the LTE system and the LTE-A system.
Figure 2:
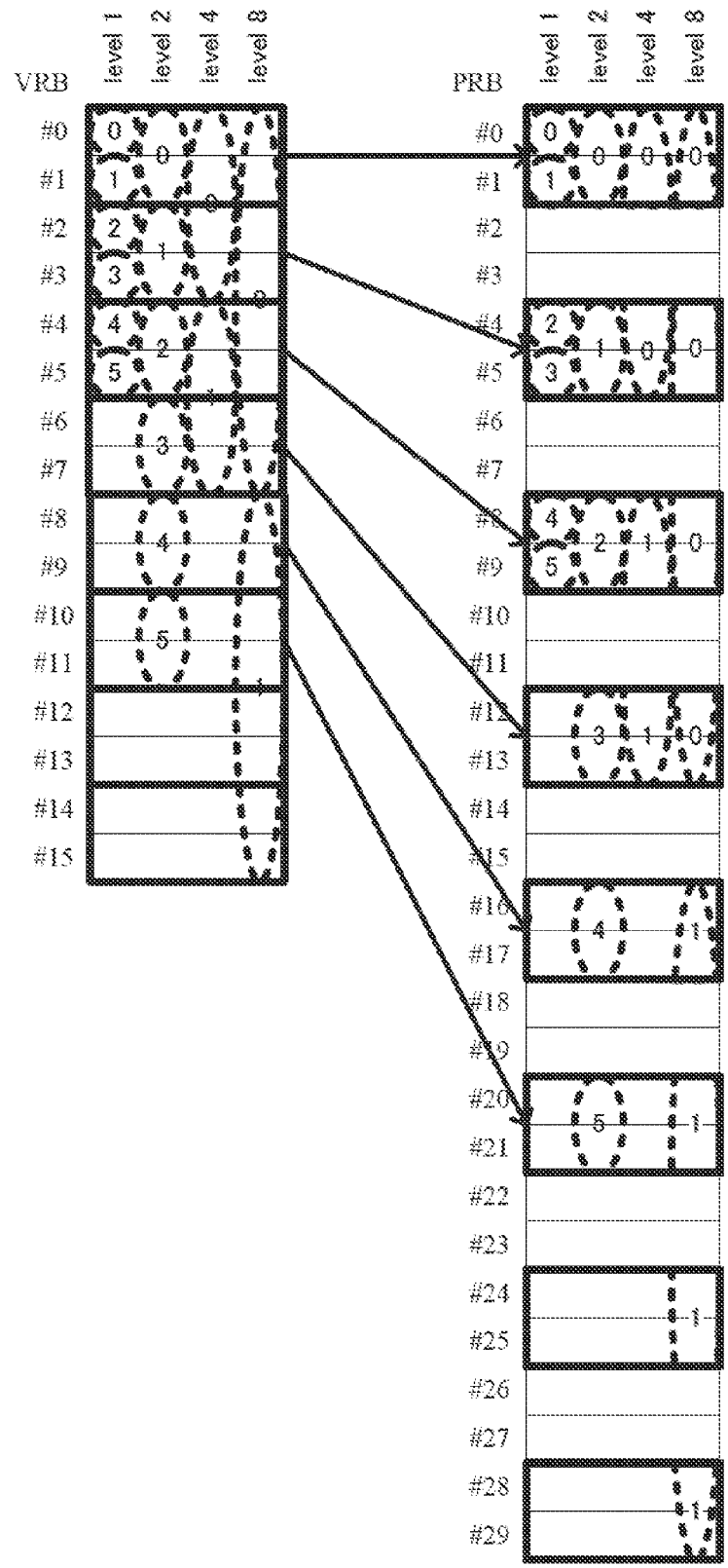
FIG. 2 illustrates example search spaces corresponding to R-PDCCH.
Figure 3:
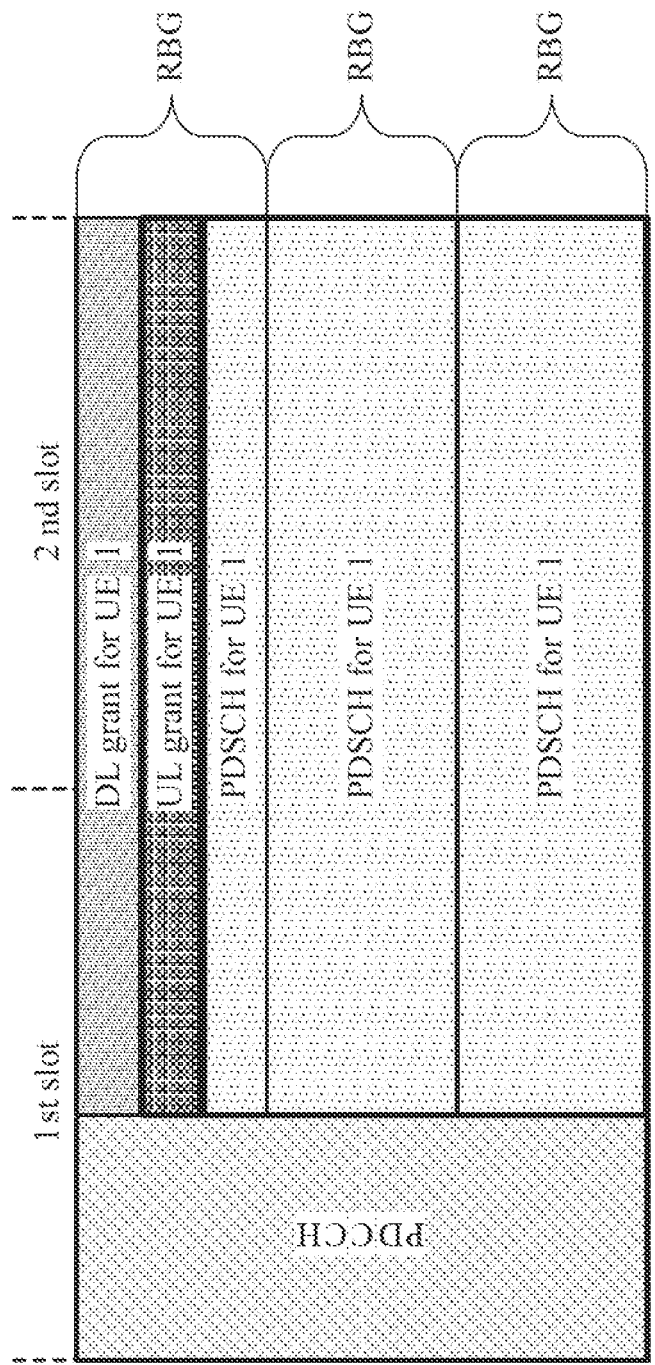
FIG. 3 illustrates an example of mapping whereby a resource to which DL grant is mapped is separated from a resource to which UL grant is mapped in the frequency domain.
Figure 4:
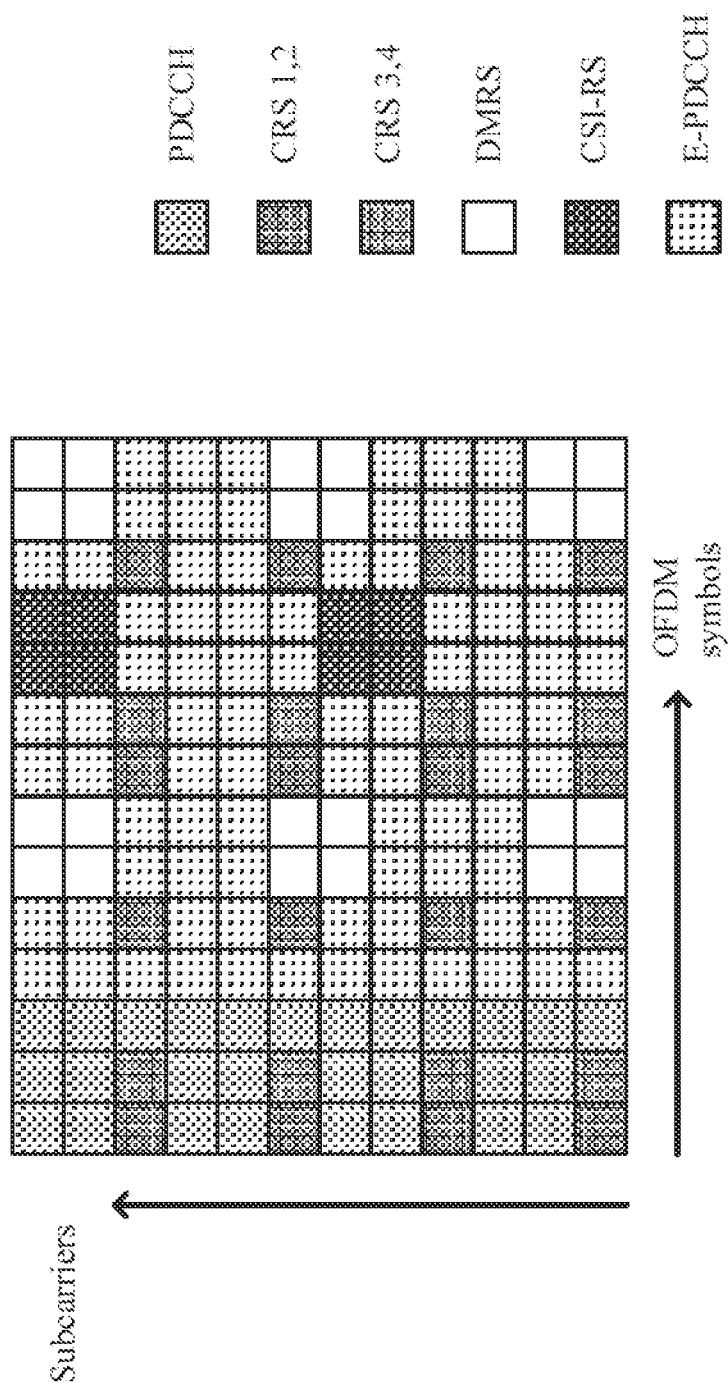
FIG. 4 is a diagram provided for describing PRB pairs.
Figure 5:
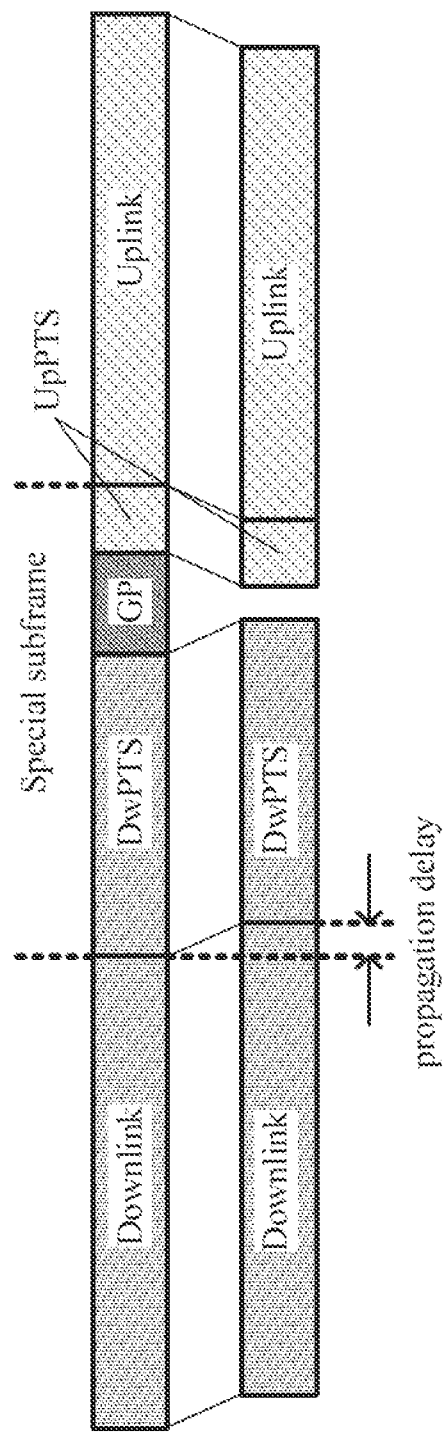
FIG. 5 illustrates a special subframe.

Embodiments of the present invention will be described in detail with reference to the drawings. In the embodiments, the same elements will be assigned the same reference numerals, and any duplicate description of the elements is omitted.

[Embodiment 1]
[Overview of Communication System]

A communication system according to Embodiment 1 of the present invention includes a transmitting apparatus and a receiving apparatus. Specifically, in this embodiment of the present invention, a description will be provided while the transmitting apparatus is referred to as base station 100, and the receiving apparatus is referred to as terminal 200. The communication system is an LTE-A system, for example. Base station 100 is an LTE-A base station, and terminal 200 is an LTE-A terminal, for example.

Figure 8:
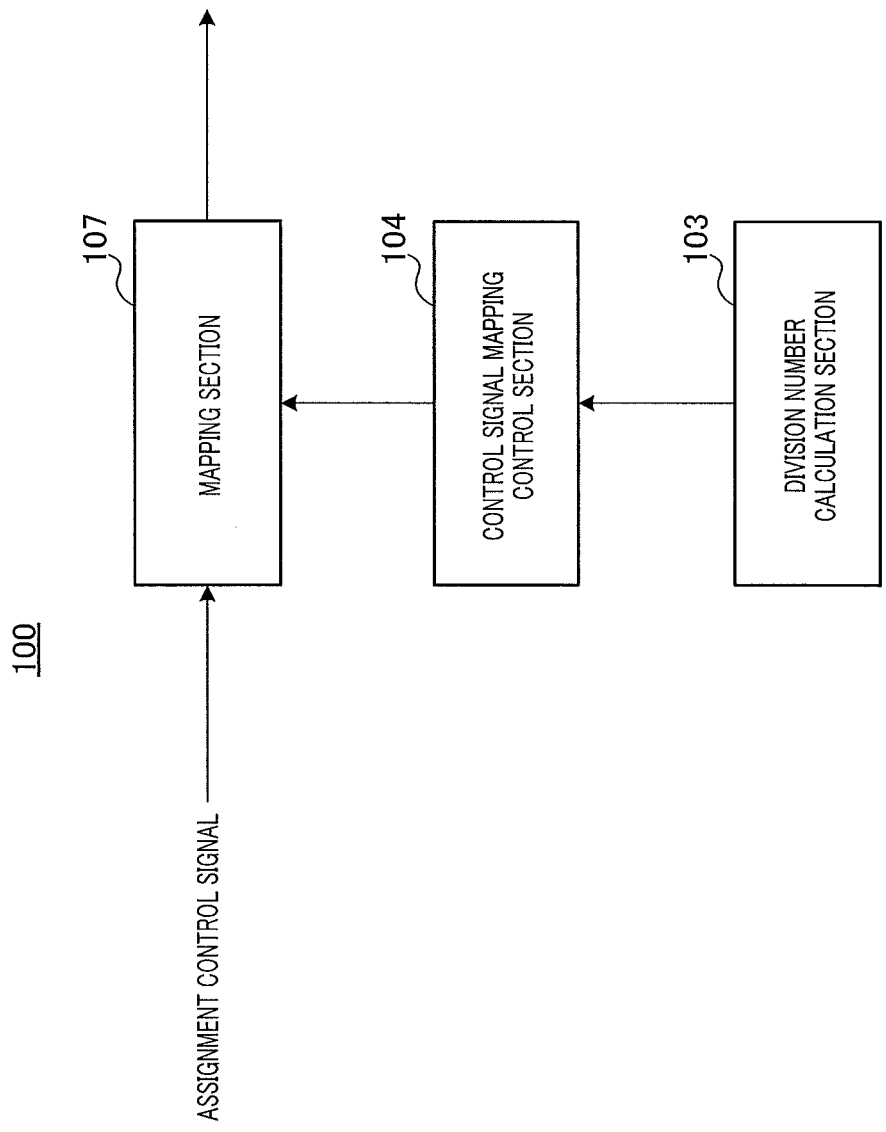
FIG. 8 is a block diagram illustrating a main configuration of a base station according to Embodiment 1 of the present invention.

FIG. 8 is a block diagram illustrating a main configuration of base station 100 according to Embodiment 1 of the present invention.

Base station 100 maps an assignment control signal to one of a plurality of "resource region candidates" forming a search space and transmits the mapped signal to terminal 200. Each resource region candidate is composed of as many CCEs as the value of aggregation level.

Division number calculation section 103 calculates the division number of a PRB pair based on a first number of REs to which an assignment control signal in each PRB pair can be mapped, a second number of REs to which a signal other than the assignment control signal is mapped and a reference value. The reference value is the number of REs that satisfy receiving quality requirements of the assignment control signal in terminal 200.

Control signal mapping control section 104 sets resource region candidates including at least one CCE obtained by dividing each PRB pair by the division number and determines a search space configured of a plurality of resource region candidates set for each PRB pair based on an aggregation level.

The assignment control signal is mapped by mapping section 107 to one of a plurality of "resource region candidates" forming a search space determined in control signal mapping control section 104 and transmitted to terminal 200.

Figure 9:
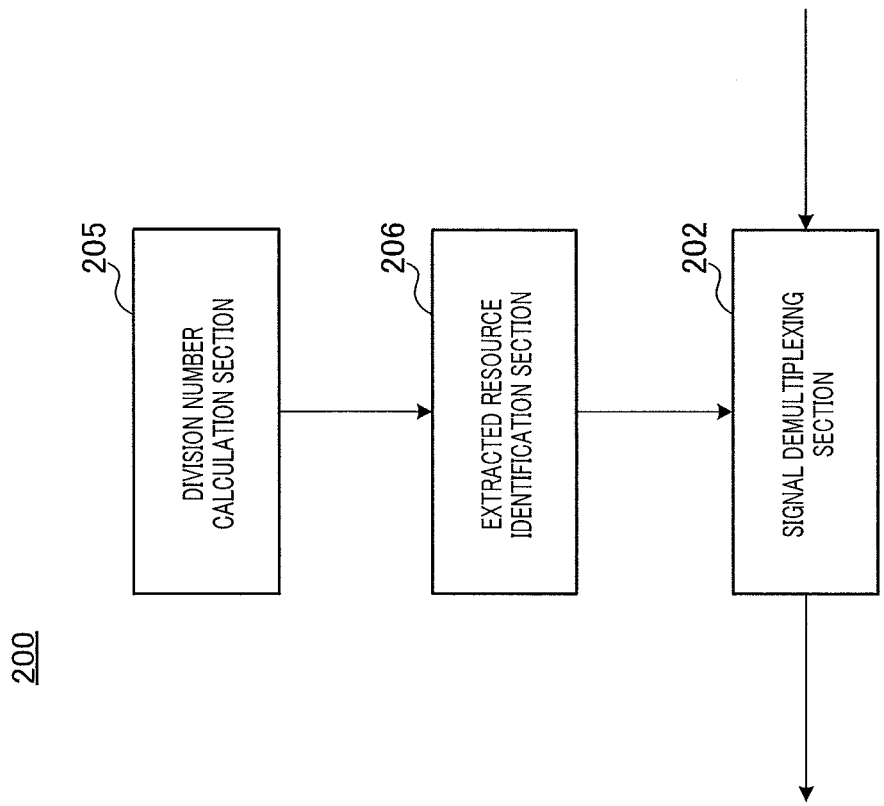
FIG. 9 is a block diagram illustrating a main configuration of a terminal according to Embodiment 1 of the present invention.

FIG. 9 is a block diagram illustrating a main configuration of terminal 200 according to Embodiment 1 of the present invention.

Terminal 200 receives an assignment control signal mapped by a transmitting apparatus to one of a plurality of "resource region candidates" forming a search space. Each "resource region candidate" is made up of as many control channel elements as the value of aggregation level.

Division number calculation section 205 calculates the division number of a PRB pair based on a first number of REs to which an assignment control signal in each PRB pair can be mapped, a second number of REs to which a signal other than the assignment control signal is mapped and a reference value. The reference value is the number of REs that satisfy receiving quality requirements of the assignment control signal in terminal 200.

Extracted resource identification section 206 sets resource region candidates including at least one CCE obtained by dividing each PRB pair by the division number and identifies a search space made up of the plurality of resource region candidates set in each PRB pair based on the aggregation level. The plurality of "resource region candidates" forming the identified search space correspond to a plurality of "resource regions to be extracted." The assignment control signal mapped by the transmitting apparatus to one of the plurality of identified "resource region candidates" is extracted by signal demultiplexing section 202, and the assignment control signal is thereby received.

[Configuration of Base Station 100]

Figure 10:
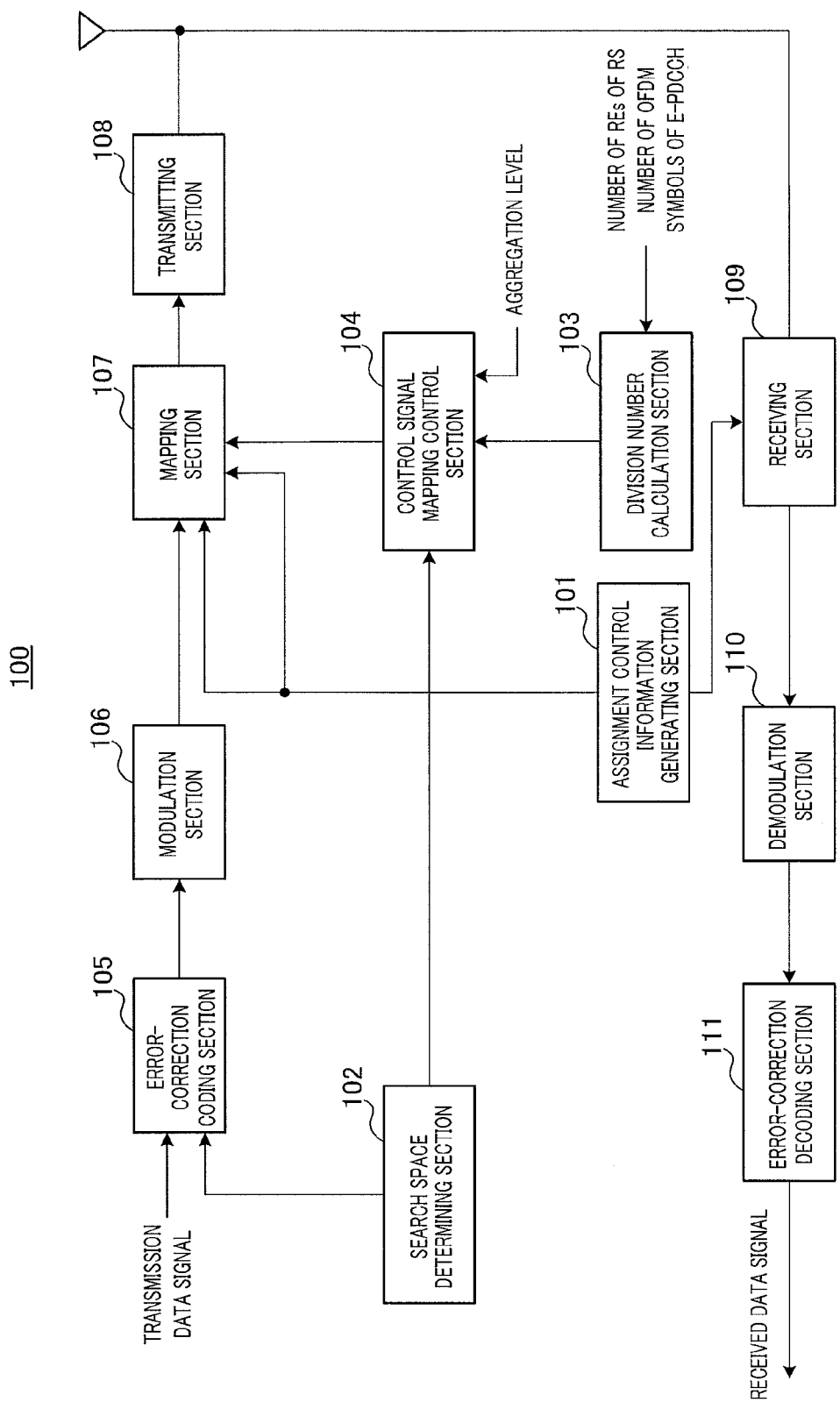
FIG. 10 is a block diagram illustrating a configuration of the base station according to Embodiment 1 of the present invention.

FIG. 10 is a block diagram illustrating a configuration of base station 100 according to Embodiment 1 of the present invention. In FIG. 10, base station 100 includes assignment control information generating section 101, search space determining section 102, division number calculation section 103, control signal mapping control section 104, error-correction coding section 105, modulation section 106, mapping section 107, transmitting section 108, receiving section 109, demodulation section 110, and error-correction decoding section 111.

When there are a data signal to be transmitted and a data signal to be assigned to an uplink, assignment control information generating section 101 determines a resource to which the data signal is assigned and generates assignment control information (DL assignment and UL grant). The DL assignment includes information on mapping resources of a downlink data signal. On the other hand, the UL grant includes information on mapping resources of uplink data to be transmitted from terminal 200. The DL assignment is outputted to mapping section 107 and the UL grant is outputted to receiving section 109.

Search space determining section 102 determines a PRB pair candidate group (that is, corresponding to the above-described first group, and hereinafter may also be referred to as "search space PRB group") to which a control signal including at least one of DL grant and UL grant transmitted to terminal 200 and outputs information on the determined "search space PRB group" (hereinafter, may also be referred to as "search space information") to control signal mapping control section 104 and error-correction coding section 105.

The information on the "search space PRB group" is a bit string composed, for example, of N bits and the N bits respectively correspond to N PRB pairs forming a communication band available to base station 100. For example, a PRB pair corresponding to bit value 1 is a PRB pair included in a search space and a PRB pair corresponding to bit value 0 is a PRB pair not included in the search space.

Division number calculation section 103 receives the number of OFDM symbols available for E-PDCCH in one PRB pair and the number of REs used for RS in one PRB pair as input and calculates the division number D by which one PRB pair is divided based on these numbers. This division number D is calculated for each subframe because the number of REs available for E-PDCCH included in one PRB pair may vary from one subframe to another. The PRB pair is divided based on the calculated division number D, and D "divided resource regions" are thereby defined. Each divided resource region is used as a CCE of E-PDCCH.

To be more specific, the division number D is calculated from equation 1 below.

(Equation 1)

Division number=⌊Number of REs available for E-PDCCH/M⌋  [1]

M is a lower limit value of the number of REs forming one CCE necessary to satisfy receiving quality requirements in the terminal.

The number of REs available for E-PDCCH can be calculated from equation 2 below.

(Equation 2)

Number of REs available for E-PDCCH=(number of OFDM symbols available for E-PDCCH in PRB pair)×(12 subcarriers)−(number of REs used for other than E-PDCCH in resource region defined by number of OFDM symbols available for E-PDCCH in PRB pair)  [2]

The number of REs used for other than E-PDCCH in the resource region defined by the number of OFDM symbols available for E-PDCCH in the PRB pair is calculated, for example, by equation 3 below.

(Equation 3)

(Number of REs used for other than E-PDCCH in resource region defined by number of OFDM symbols available for E-PDCCH in PRB pair)= (number of REs used for DMRS in symbols used for E-PDCCH)−(number of muting set REs of CSI-RS in symbols used for E-PDCCH)  [3]

When PRS is taken into consideration, the number of REs used for PRS is further subtracted in symbols used for E-PDCCH.

Control signal mapping control section 104 determines a search space corresponding to a pair of the division number M calculated in division number calculation section 103 and an aggregation level based on the division number M, "search space information" received from search space determining section 102 and the aggregation level. Control signal mapping control section 104 selects one of a plurality of "resource region candidates" forming the determined search space as a "control signal mapping resource." Here, the "control signal mapping resource" is a resource region to which a control signal intended for terminal 200 is actually mapped. Furthermore, each "resource region candidate" is made up of as many CCEs as aggregation levels. Furthermore, the "control signal mapping resource" is also made up of as many CCEs as aggregation levels. However, although the number of REs forming a CCE normally varies depending on the division number M, it is leveled.

Error-correction coding section 105 receives the transmission data signal and the search space information as input, performs error-correction coding on the inputted signal and outputs the coded signal to modulation section 106.

Modulation section 106 applies modulation processing to the signal received from error-correction coding section 105 and outputs the modulated data signal to mapping section 107.

Mapping section 107 maps the assignment control information generated in assignment control information generating section 101 to the "control signal mapping resource" determined in control signal mapping control section 104.

Furthermore, mapping section 107 maps the data signal received from modulation section 106 to a downlink resource corresponding to the downlink resource allocation control information (DL assignment) generated in assignment control information generating section 101.

The assignment control information and the data signal are mapped to predetermined resources in this way, and a transmission signal is thereby formed. The transmission signal thus formed is outputted to transmitting section 108.

Transmitting section 108 applies radio transmission processing such as up-conversion to the input signal and transmits the signal to terminal 200 via an antenna.

Receiving section 109 receives the signal transmitted from terminal 200 and outputs the received signal to demodulation section 110. To be more specific, receiving section 109 separates a signal corresponding to a resource indicated by UL grant from the received signal, applies reception processing such as down-conversion to the separated signal and outputs the signal to demodulation section 110.

Demodulation section 110 applies demodulation processing to the input signal and outputs the signal obtained to error-correction decoding section 111.

Error-correction decoding section 111 decodes the input signal and obtains a received data signal from terminal 200.

[Configuration of Terminal 200]

Figure 11:
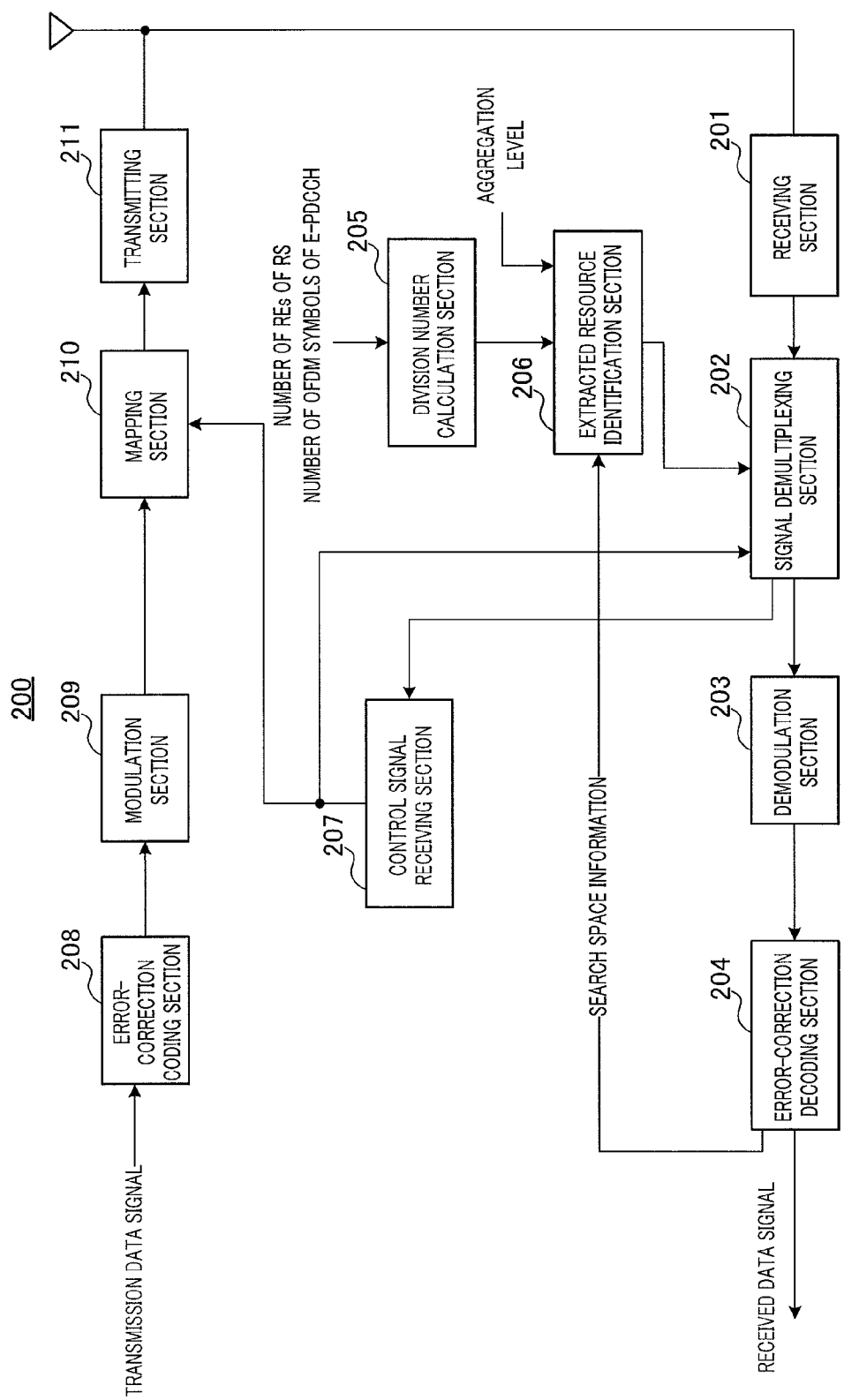
FIG. 11 is a block diagram illustrating a configuration of the terminal according to Embodiment 1 of the present invention.

FIG. 11 is a block diagram illustrating a configuration of terminal 200 according to Embodiment 1 of the present invention. In FIG. 11, terminal 200 includes receiving section 201, signal demultiplexing section 202, demodulation section 203, error-correction decoding section 204, division number calculation section 205, extracted resource identification section 206, control signal receiving section 207, error-correction coding section 208, modulation section 209, mapping section 210, and transmitting section 211.

Receiving section 201 receives a signal transmitted from base station 100, applies reception processing such as down-conversion thereto and then outputs the signal to signal demultiplexing section 202.

Signal demultiplexing section 202 extracts, from the received signal, a signal corresponding to a "resource region group to be extracted" indicated by an "extraction indication signal" received from extracted resource identification section 206 and outputs the extracted signal to control signal receiving section 207. The "resource region group to be extracted" corresponds to the "resource region candidate group" determined in control signal mapping control section 104.

Furthermore, signal demultiplexing section 202 extracts a signal corresponding to a data resource indicated by DL assignment outputted from control signal receiving section 207 (that is, downlink data signal) from the received signal and outputs the extracted signal to demodulation section 203.

Demodulation section 203 demodulates the signals from signal demultiplexing section 202 and outputs the demodulated signals to error-correction decoding section 204.

Error-correction decoding section 204 decodes the demodulated signals outputted from demodulation section 203 and outputs the decoded received data signals. Specifically, error-correction decoding section 204 outputs search space information transmitted from base station 100 to extracted resource identification section 206.

Division number calculation section 205 has the same function as that of division number calculation section 103. That is, division number calculation section 205 receives the number of OFDM symbols available for E-PDCCH in one PRB pair and the number of REs available for RS in one PRB pair as input and calculates the division number D by which one PRB pair is divided based on these numbers. The PRB pair is divided based on the calculated division number D and D "divided resource regions" are thereby defined. Each divided resource region is used as a CCE of E-PDCCH. The number of REs used by CRS in one PRB pair is indicated from base station 100 to terminal 200 through a broadcast channel. The number of REs used by DMRS in one PRB pair may vary from one terminal to another. Therefore, the number of REs used by DMRS may be previously specified from base station 100 to terminal 200 by a higher layer control signal during E-PDCCH transmission. Furthermore, the number of REs and the period used by CSI-RS in one PRB pair are specified from base station 100 to terminal 200 by a higher layer control signal for each terminal.

Extracted resource identification section 206 identifies a plurality of "resource regions to be extracted" (that is, search spaces) corresponding to a pair of the division number M calculated in division number calculation section 205 and an aggregation level based on the division number M, the search space information transmitted from base station 100 and the aggregation level. Extracted resource identification section 206 outputs information on the plurality of identified "resource regions to be extracted" to signal demultiplexing section 202 as an "extraction indication signal."

Control signal receiving section 207 performs blind decoding on the signal received from signal demultiplexing section 202 and thereby detects a control signal (DL assignment or UL grant) intended for terminal 200 of control signal receiving section 207. The detected DL assignment intended for terminal 200 is outputted to signal demultiplexing section 202 and the detected UL grant intended for terminal 200 is outputted to mapping section 210.

Error-correction coding section 208 uses the transmission data signals as input, performs error-correction coding on the transmission data signals, and outputs the coded signal to modulation section 209.

Modulation section 209 modulates the signal outputted from error-correction coding section 208 and outputs the modulated signal to mapping section 210.

Mapping section 210 maps the signal outputted from modulation section 209 according to the UL grant received from control signal receiving section 207 and outputs the mapped signal to transmitting section 211.

Transmitting section 211 applies transmission processing such as up-conversion to the input signal and transmits the signal.

[Operations of Base Station 100 and Terminal 200]

The operations of base station 100 and terminal 200 configured in the manner described above will be described.

<Division Number Calculation Processing by Base Station 100>

Division number calculation section 103 in base station 100 receives the number of OFDM symbols available for E-PDCCH in one PRB pair and the number of REs used for RS in one PRB pair as input and calculates the division number D by which one PRB pair is divided based on these numbers. D "divided resource regions" are defined by dividing the PRB pair based on the calculated division number D. Each divided resource region is used as a CCE of E-PDCCH.

To be more specific, the division number is calculated using equation 1 described above. That is, the division number is calculated based on the "reference number of REs" and the number of REs that can be used for E-PDCCH in the PRB pair to be calculated so that the number of REs forming each CCE becomes at least equal to the "reference number of REs." Even when the number of REs per PRB pair varies from one subframe to another, this allows the number of REs per PRB pair to be leveled among subframes, thus making it possible to secure receiving quality per CCE to a certain level or higher. That is, even when transmitting assignment control information to a terminal of poor receiving quality located near the cell edge, it is possible to use subframes having fewer REs per PRB pair. However, when the division number calculated according to equation 1 described above is zero, "1" is used as the division number. Furthermore, when the value that the division number can take is limited to 1, 2 or 4, "2" is used as the division number when the division number calculated by equation 1 is "3."

<Control signal Mapping Resource Determination Processing by Base Station 100>

Control signal mapping control section 104 in base station 100 determines a search space corresponding to a pair of the division number M and the aggregation level based on the division number M calculated in division number calculation section 103, "search space information" received from search space determining section 102 and the aggregation level. Control signal mapping control section 104 then selects one of the plurality of "resource region candidates" forming the determined search space as a "control signal mapping resource." By being mapped to the determined control signal mapping resource, the assignment control information generated in assignment control information generating section 101 is transmitted from base station 100 to terminal 200.

<Division number Calculation Processing by Terminal 200>

Division number calculation section 205 in terminal 200 receives the number of OFDM symbols available for E-PDCCH in one PRB pair and the number of REs used for RS in one PRB pair as input, and calculates the division number D by which one PRB pair is divided based on these numbers. D "divided resource regions" are defined by dividing the PRB pair based on the calculated division number D.

<Extracted Resource Identification Processing by Terminal 200>

Extracted resource identification section 206 in terminal 200 identifies a plurality of "resource regions to be extracted" (that is, search spaces) corresponding to a pair of the division number M and the aggregation level based on the division number M calculated in division number calculation section 205, the search space information transmitted from base station 100 and the aggregation level. Signals corresponding to the plurality of identified "resource regions to be extracted" in the received signal are subjected to blind decoding processing in control signal receiving section 207.

As described above, according to the present embodiment, division number calculation section 103 in base station 100 calculates the division number of a PRB pair based on a first number of REs to which an assignment control signal in each PRB pair can be mapped, a second number of REs to which a signal other than the assignment control signal is mapped and a reference value. The reference value is the number of REs that satisfy receiving quality requirements of the assignment control signal in terminal 200.

Control signal mapping control section 104 determines a search space by determining a control channel element group (that is, a physical channel CCE group used) forming a plurality of resource region candidates among CCE groups obtained by dividing each PRB pair included in the first group by the same number as the division number.

In this manner, the number of REs included in a CCE can be leveled even when there is a variation in the number of REs which are included in the PRB pair and to which an assignment control signal can be mapped. This makes it possible to improve receiving quality of the control signal.

According to the present embodiment, division number calculation section 205 in terminal 200 calculates the division number of a PRB pair based on a first number of REs to which an assignment control signal in each PRB pair can be mapped, a second number of REs to which a signal other than the assignment control signal is mapped and a reference value. The reference value is the number of REs that satisfy receiving quality requirements of the assignment control signal in terminal 200.

Extracted resource identification section 206 identifies a search space by identifying a control channel element group forming a plurality of "resource region candidates" in a CCE group obtained by dividing each PRB pair included in the first group set in base station 100 into the same number as the division number. The plurality of "resource region candidates" forming the identified search space, correspond to a plurality of "resource regions to be extracted."

[Embodiment 2]

Embodiment 2 relates to a method for mapping a logical channel (VRB) to a physical channel (PRB). Since basic configurations of a base station and a terminal according to Embodiment 2 are common to those of base station 100 and terminal 200 according to Embodiment 1, they will be described with reference to FIGS. 10 and 11.

In base station 100 of Embodiment 2, control signal mapping control section 104 identifies a search space corresponding to a pair of the division number M calculated in division number calculation section 103 and an aggregation level based on the division number M, the "search space information" received from search space determining section 102 and the aggregation level.

To be more specific, a search space is identified based on a "VRB table," the division number M, "search space information," an aggregation level, and an "association rule" per pair of the division number M and the aggregation level. The search space is made up of a plurality of "resource region candidates" and each "resource region candidate" is made up of as many CCEs (hereinafter may also be referred to as "mapping candidate CCEs") as aggregation levels.

Figure 12:
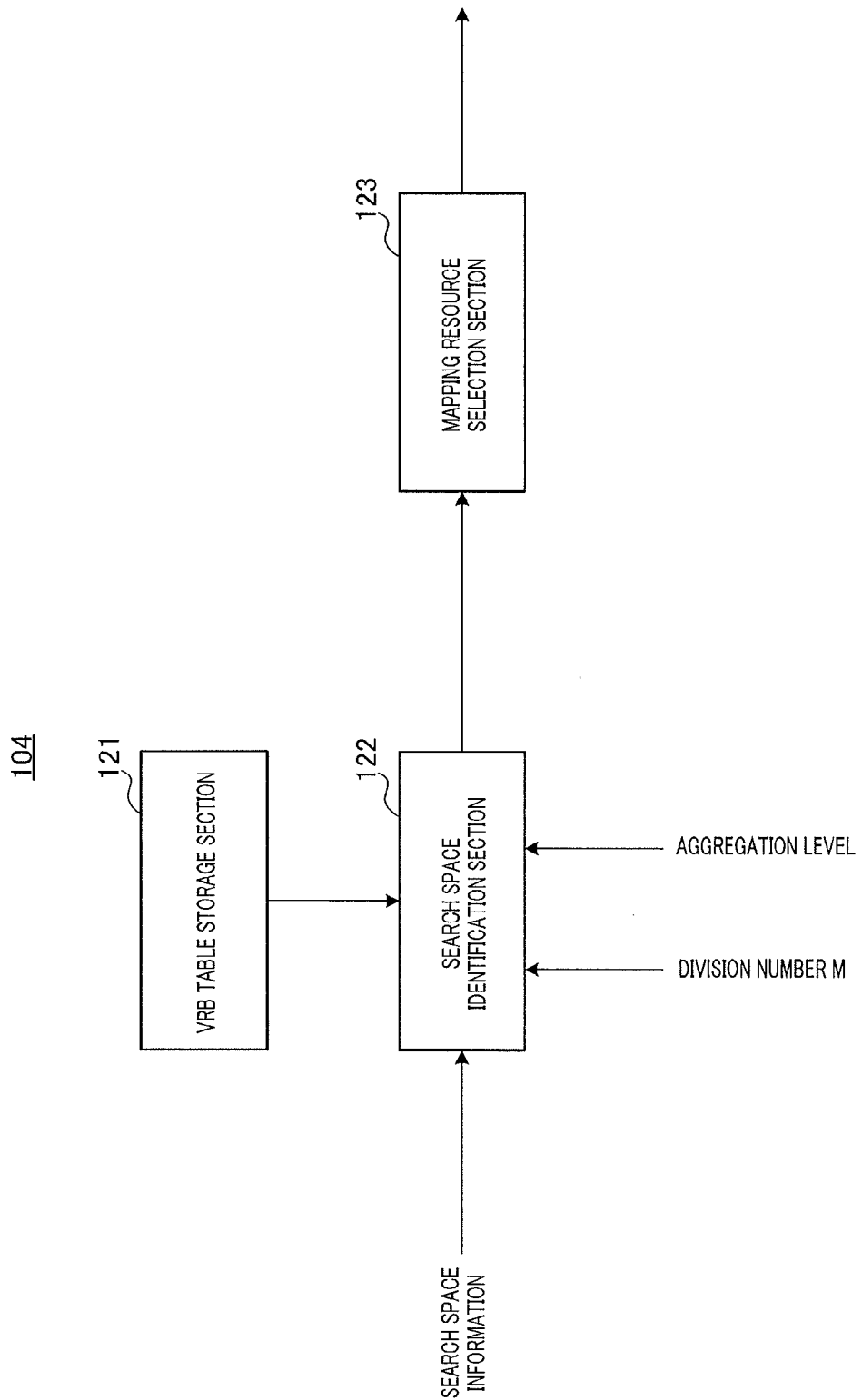
FIG. 12 is a block diagram illustrating a configuration of a control signal mapping control section according to Embodiment 2 of the present invention.

More specifically, as shown in FIG. 12, control signal mapping control section 104 includes VRB table storage section 121, search space identification section 122 and mapping resource selection section 123.

VRB table storage section 121 stores a "VRB table." The "VRB table" associates a plurality of VRB pairs with a divided resource region (that is, "virtual channel CCE") group per division number candidate of each VRB pair. The "VRB table" further associates a plurality of pairs of the division number candidate and aggregation level candidate with a plurality of "virtual channel unit resource region candidates" in accordance with each pair. Each "virtual channel unit resource region candidate" is made up of as many "virtual channel CCEs used" as aggregation levels.

Search space identification section 122 identifies the virtual channel CCE group used associated in the VRB table with a pair of the division number M calculated in division number calculation section 103 and the aggregation level. Search space identification section 122 then identifies a search space of the physical channel based on the identified virtual channel CCE group used, "search space information" received from search space determining section 102 and an "association rule" corresponding to the pair of the division number M calculated in division number calculation section 103 and the aggregation level. The "association rule" associates a "virtual channel unit resource region candidate" with a "physical channel resource region candidate." The identified search space is made up of a plurality of "resource region candidates" and each "resource region candidate" is made up of as many "physical channel CCEs used" as aggregation levels. The "physical channel CCE used" means the same as the above-described "mapping candidate CCE."

In the "VRB table," the "unit resource region candidate" corresponding to the pair of the division number M and aggregation level L is common to the "unit resource region candidate" corresponding to the pair of the division number 2M and aggregation level 2L. Furthermore, the "association rule" corresponding to the pair of the division number M and aggregation level L is common to the "association rule" corresponding to the pair of the division number 2M and aggregation level 2L.

Mapping resource selection section 123 selects one of the plurality of "resource region candidates" forming the search space identified by search space identification section 122 as a control signal mapping resource.

In terminal 200 of Embodiment 2, extracted resource identification section 206 identifies a plurality of "resource region groups to be extracted" (that is, search spaces) corresponding to the pair of the division number M calculated in division number calculation section 205 and an aggregation level based on the division number M, the search space information transmitted from base station 100 and the aggregation level.

To be more specific, a search space is identified based on the "VRB table," the division number M, the "search space information," the aggregation level, and the "association rule" per pair of the division number M and the aggregation level. Each search space is made up of a plurality of "resource regions to be extracted" and each "resource region to be extracted" is made up of as many CCEs (hereinafter, may also be referred to as "CCEs to be extracted") as aggregation levels.

Figure 13:
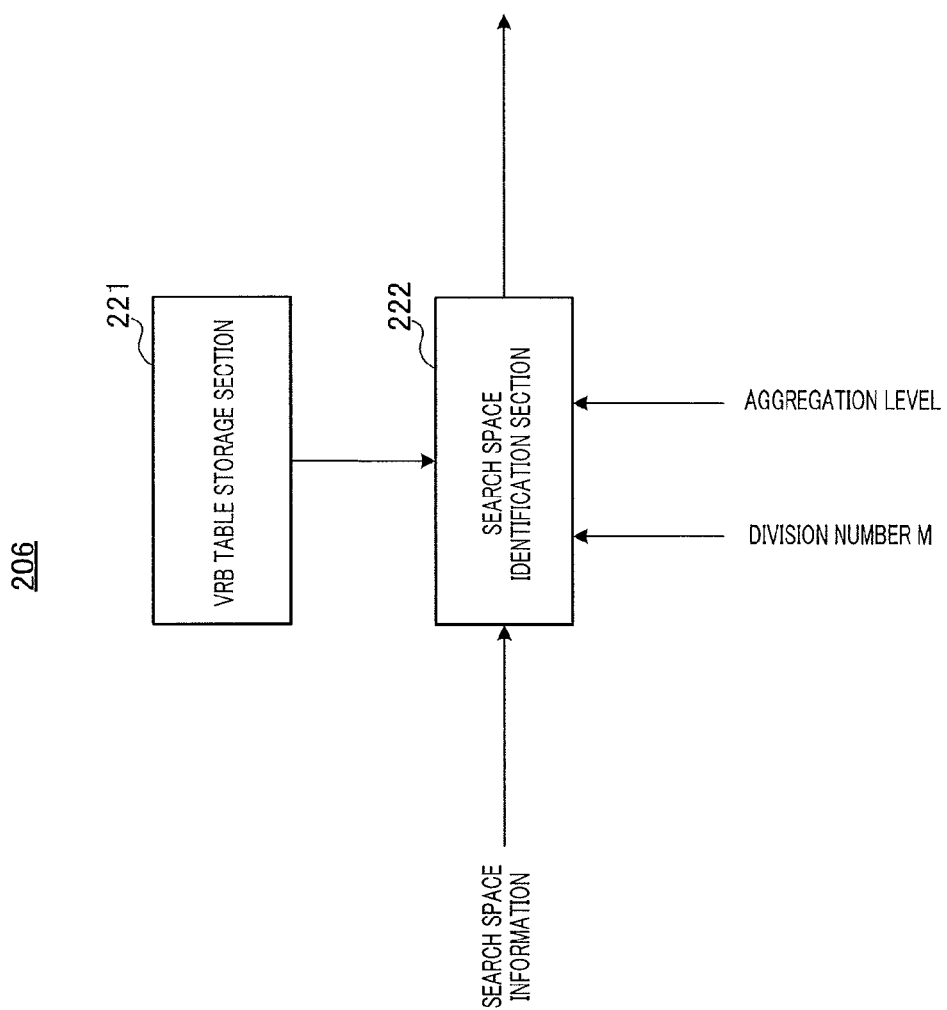
FIG. 13 is a block diagram illustrating a configuration of an extracted resource identification section according to Embodiment 2 of the present invention.

More specifically, extracted resource identification section 206 includes VRB table storage section 221 and search space identification section 222 as shown in FIG. 13.

VRB table storage section 221 stores the same "VRB table" as that of base station 100. That is, the "VRB table" associates a plurality of VRB pairs with a divided resource region (that is, "virtual channel CCE") group per division number candidate of each VRB pair. The "VRB table" further associates the plurality of pairs of division number and aggregation level candidates with the plurality of "virtual channel resource regions to be extracted" corresponding to each pair. Each "virtual channel resource region to be extracted" is made up of as many "virtual channel CCE used" as aggregation levels.

Search space identification section 222 identifies a virtual channel CCE group used associated in the VRB table with the pair of the division number M calculated in division number calculation section 205 and the aggregation level. Search space identification section 222 then identifies a search space of the physical channel based on the identified virtual channel CCE group used, the "search space information," and the "association rule" corresponding to the pair of the division number M calculated in division number calculation section 205 and the aggregation level. The "association rule" associates a "virtual channel resource region to be extracted" with a "physical channel resource region to be extracted." The identified search space is made up of a plurality of "resource regions to be extracted" and each "resource region to be extracted" is made up of as many "physical channel CCEs used" as aggregation levels. The "physical channel CCE used" means the same as the above-described "CCE to be extracted."

Here, the "unit resource region candidate" corresponding to the pair of the division number M and aggregation level L in the "VRB table" is common to the "unit resource region candidate" corresponding to the pair of the division number 2M and aggregation level 2L. Furthermore, the "association rule" corresponding to the pair of the division number M and aggregation level L is common to the "association rule" corresponding to the pair of the division number 2M and aggregation level 2L.

Figure 14:
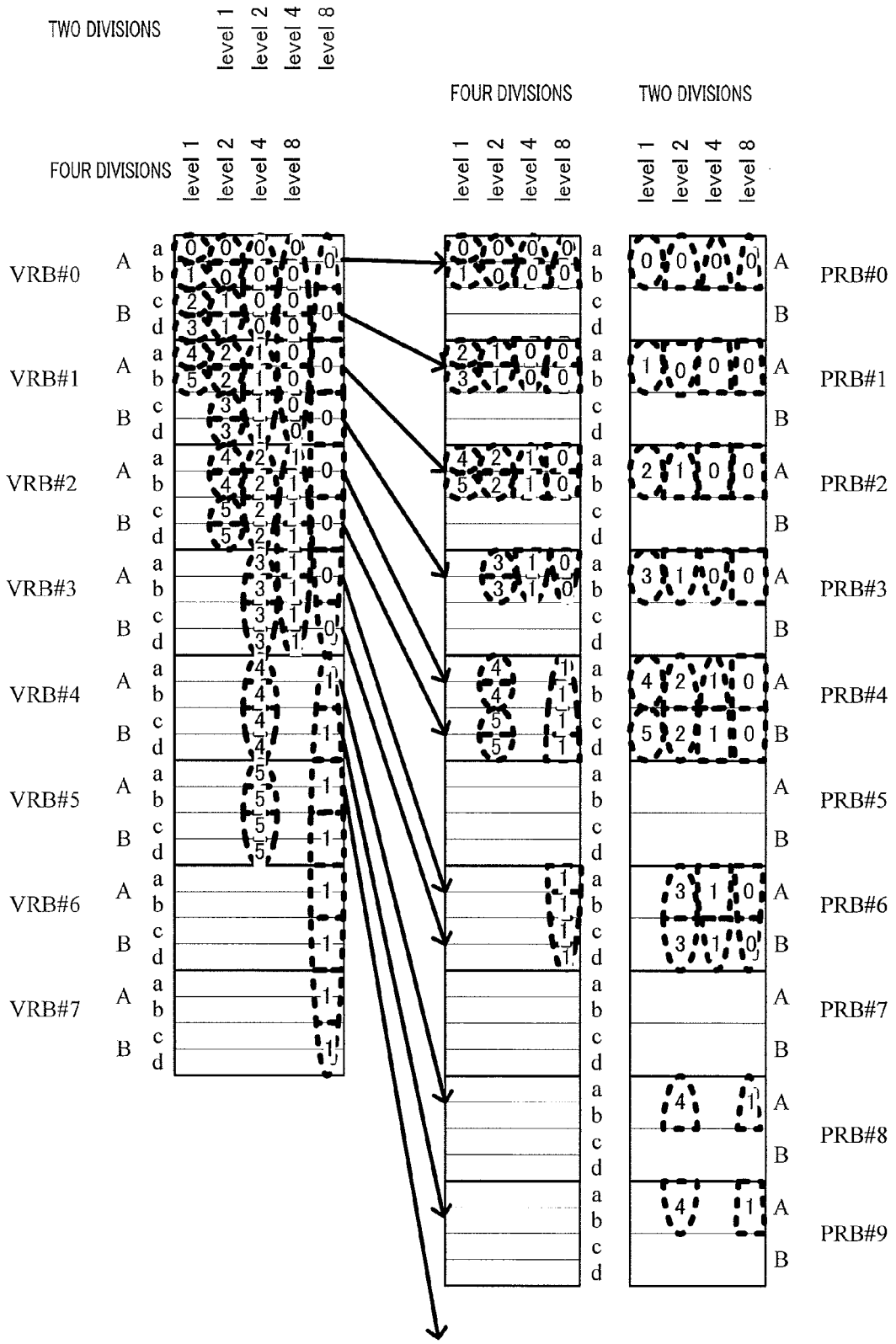
FIG. 14 is a diagram provided for describing the operations of a base station and a terminal according to Embodiment 2 of the present invention.

The operations of base station 100 and terminal 200 configured in the manner described above will be described. Here, in particular, a case will be described as an example where the division number=2 and the division number=4. FIG. 14 is a diagram provided for describing the operations of base station 100 and terminal 200.

The diagram on the left of FIG. 14 visually expresses contents of the "VRB table." In the "VRB table" shown in FIG. 14, there are four aggregation levels: levels 1, 2, 4 and 8. Search spaces at levels 1, 2, 4 and 8 have 6, 6, 2 and 2 "virtual channel unit resource region candidates" respectively. Four virtual channel CCEs obtained by dividing VRB#X which is one VRB pair into 4 are called VRB#X(a), VRB#X(b), VRB#X(c) and VRB#X(d). On the other hand, four physical channel CCEs obtained by dividing PRB#X which is one PRB pair into 4 are called PRB#X(a), PRB#X(b), PRB#X(c) and PRB#X(d). Two virtual channel CCEs obtained by dividing VRB#X which is one VRB pair into 2 are called VRB#X(A) and VRB#X(B). On the other hand, two physical channel CCEs obtained by dividing PRB#X which is one PRB pair into 2 are called PRB#X(A) and PRB#X(B).

The "VRB table" in FIG. 14 includes eight VRB pairs: VRB#0 to VRB#7. For search spaces, as many "virtual channel unit resource region candidates" as aggregation levels are continuously arranged in eight VRB pairs from VRB#0. In the "VRB table" in FIG. 14, a resource combining VRB#X(a) and VRB#X(b) is VRB#X(A) and a resource combining VRB#X(c) and VRB#X(d) is VRB#X(B).

Search space identification section 122 identifies a virtual channel CCE group used associated in the VRB table with a pair of the division number M calculated in division number calculation section 103 and the aggregation level.

For example, when the division number=4 and the aggregation level=1, VRB#0(a), VRB#0(b), VRB#0(c), VRB#X0(d), VRB#1(a) and VRB#1(b) are identified as a virtual channel CCE group used. Note that when the aggregation level=1, the virtual channel CCE used is equal to the "virtual channel unit resource region candidate."

For example, when the division number=4 and the aggregation level=2, VRB#0(a), VRB#0(b), VRB#0(c), VRB#X0(d), VRB#1(a), VRB#1(b), VRB#1(c), VRB#X1(d), VRB#2(a), VRB#2(b), VRB#2(c) and VRB#X2(d) are identified as a virtual channel CCE group used. On the other hand, when the division number=2 and the aggregation level=1, VRB#0(A), VRB#0(B), VRB#1(A), VRB#1(B), VRB#2(A) and VRB#2(B) are identified as a virtual channel CCE group used. As described above, a resource combining VRB#X(a) and VRB#X(b) is VRB#X(A) and a resource combining VRB#X(c) and VRB#X(d) is VRB#X(B) in the "VRB table." The "virtual channel unit resource region candidate" in the case where the division number=4 and the aggregation level=2 matches that in the case where the division number=2 and the aggregation level=1.

When the division number=4 and aggregation level=4, VRB#0(A), VRB#0(B), VRB#1(A), VRB#1(B), VRB#2(A), VRB#2(B), VRB#3(A), VRB#3(B), VRB#4(A), VRB#4(B), VRB#5(A) and VRB#5(B) are identified as a virtual channel CCE group used. At this time, the "virtual channel unit resource region candidates" are {VRB#0(A), VRB#0(B)}, {VRB#1(A), VRB#1(B)}, {VRB#2(A), VRB#2(B)}, {VRB#3(A), VRB#3(B)}, {VRB#4(A), VRB#4(B)}, and {VRB#5(A), VRB#5(B)}. Here, a set of VRBs enclosed by { } makes up one "virtual channel unit resource region candidate." The "virtual channel unit resource region candidate" in the case where the division number=4 and the aggregation level=4 matches that in the case where the division number=2 and the aggregation level=2. However, when the division number=4 and the aggregation level=4, since there are two "virtual channel unit resource region candidates," only {VRB#0(A), VRB#0(B)} and {VRB#1(A), VRB#1(B)} are used.

When the division number=4 and the aggregation level=8, VRB#0(A), VRB#0(B), VRB#1(A), VRB#1(B), VRB#2(A), VRB#2(B), VRB#3(A), and VRB#3(B) are identified as a virtual channel CCE group used. At this time, there are two "virtual channel unit resource region candidates": {VRB#0(A), VRB#0(B), VRB#1(A), VRB#1(B)} and {VRB#2(A), VRB#2(B), VRB#3(A), VRB#3(B)}. The "virtual channel unit resource region candidate" in the case where the division number=4 and the aggregation level=8 matches that in the case where the division number=2 and the aggregation level=4.

When the division number=2 and the aggregation level=8, the "virtual channel unit resource region candidates" are {VRB#0(A), VRB#0(B), VRB#1(A), VRB#1(B), VRB#2(A), VRB#2(B), VRB#3(A), VRB#3(B)}, and {VRB#4(A), VRB#4(B), VRB#5(A), VRB#5(B), VRB#6(A), VRB#6(B), VRB#7(A), VRB#7(B)}.

Search space identification section 122 identifies a search space of the physical channel based on the identified virtual channel CCE group used, "search space information" received from search space determining section 102, and the "association rule" corresponding to the pair of the division number M calculated in division number calculation section 103 and the aggregation level.

For example, when the division number=4 and the aggregation level=2, as shown in the diagram in the middle of FIG. 14, VRB#0(A), VRB#0(B), VRB#1(A), VRB#1(B), VRB#2 (A) and VRB#2(B) are mapped to PRB#0(A), PRB#1(A), PRB#2(A), PRB#3(A), PRB#4(A) and PRB#4(B) according to the "association rule." When the division number=2 and the aggregation level=1, as shown in the diagram on the right of FIG. 14, VRB#0(A), VRB#0(B), VRB#1(A), VRB#1(B), VRB#2(A) and VRB#2(B) are mapped to PRB#0(A), PRB#1 (A), PRB#2(A), PRB#3(A), PRB#4(A) and PRB#4(B) according to the "association rule." That is, the "association rule" in the case where the division number=4 and the aggregation level=2 matches that in the case where the division number=2 and the aggregation level=1.

On the other hand, terminal 200 performs processing similar to that of base station 100. That is, search space identification section 222 identifies the virtual channel CCE group used associated in the VRB table with the pair of the division number M calculated in division number calculation section 205 and the aggregation level. Search space identification section 222 identifies a search space of the physical channel based on the identified virtual channel CCE group used, "search space information" and the "association rule" corresponding to the pair of the division number M calculated in division number calculation section 205 and the aggregation level.

As described above, according to the present embodiment, control signal mapping control section 104 in base station 100 determines a search space by determining a control channel element group forming a plurality of resource region candidates among CCE groups obtained by dividing each PRB pair included in the first group into the same number as the division number. The plurality of resource region candidates are common when the division number is M (M is a natural number) and the value of the aggregation level is A (A is a natural number) and when the division number is 2M and the value of the aggregation level is 2A.

Even when the division number of a PRB pair varies from one subframe to another, assignment of physical resources can be made common in this way, and it is thereby possible to reduce the amount of signaling when base station 100 indicates the physical resources to terminal 200. Furthermore, if a PRB pair having good quality is included in the first group in the first subframe, it is possible to continue to use the PRB pair even when the division number varies from one subframe to another.

According to the present embodiment, extracted resource identification section 206 in terminal 200 identifies a search space by identifying a control channel element group forming a plurality of resource region candidates in the CCE group obtained by dividing each PRB pair included in the first group into the same number as the division number. The plurality of resource region candidates forming the identified search space correspond to the plurality of "resource regions to be extracted." The plurality of "resource regions to be extracted" are common when the division number is M (M is a natural number) and the value of the aggregation level is A (A is a natural number) and when the division number is 2M and the value of the aggregation level is 2A.

[Embodiment 3]

Embodiment 3 relates to variations of a method for mapping a logical channel (VRB) to a physical channel (PRB).

Note that since basic configurations of a base station and a terminal according to Embodiment 3 are common to those of base station 100 and terminal 200 according to Embodiment 1 and Embodiment 2, they will be described with reference to FIGS. 10 and 11.

In base station 100 according to Embodiment 3, control signal mapping control section 104 identifies a search space corresponding to a pair of the division number M calculated in division number calculation section 103 and an aggregation level based on the division number M, the "search space information" received from search space determining section 102 and the aggregation level.

To be more specific, a search space is identified based on a "VRB table", the division number M, "search space information," aggregation level, a "first type association rule" and a "second type association rule." Here, the "first type association rule" is a rule that associates "virtual channel unit resource region candidates" with "physical channel unit resource region candidates" regarding the pair of the division number M/2 and the aggregation level as in the case of Embodiment 2. On the other hand, the "second type association rule" is a rule that associates "resource region candidates" regarding the pair of the division number M/2 and the aggregation level with "resource region candidates" regarding the pair of the division number M and the aggregation level. That is, the "second type association rule" is a rule that associates "physical channel CCEs" regarding the division number M/2 with "physical channel CCEs" regarding the division number M in a given PRB pair. Here, in the case of the division number M, up to M/2 of M physical channel CCEs included in one PRB pair may be designated as physical channel CCEs used.

Figure 15:
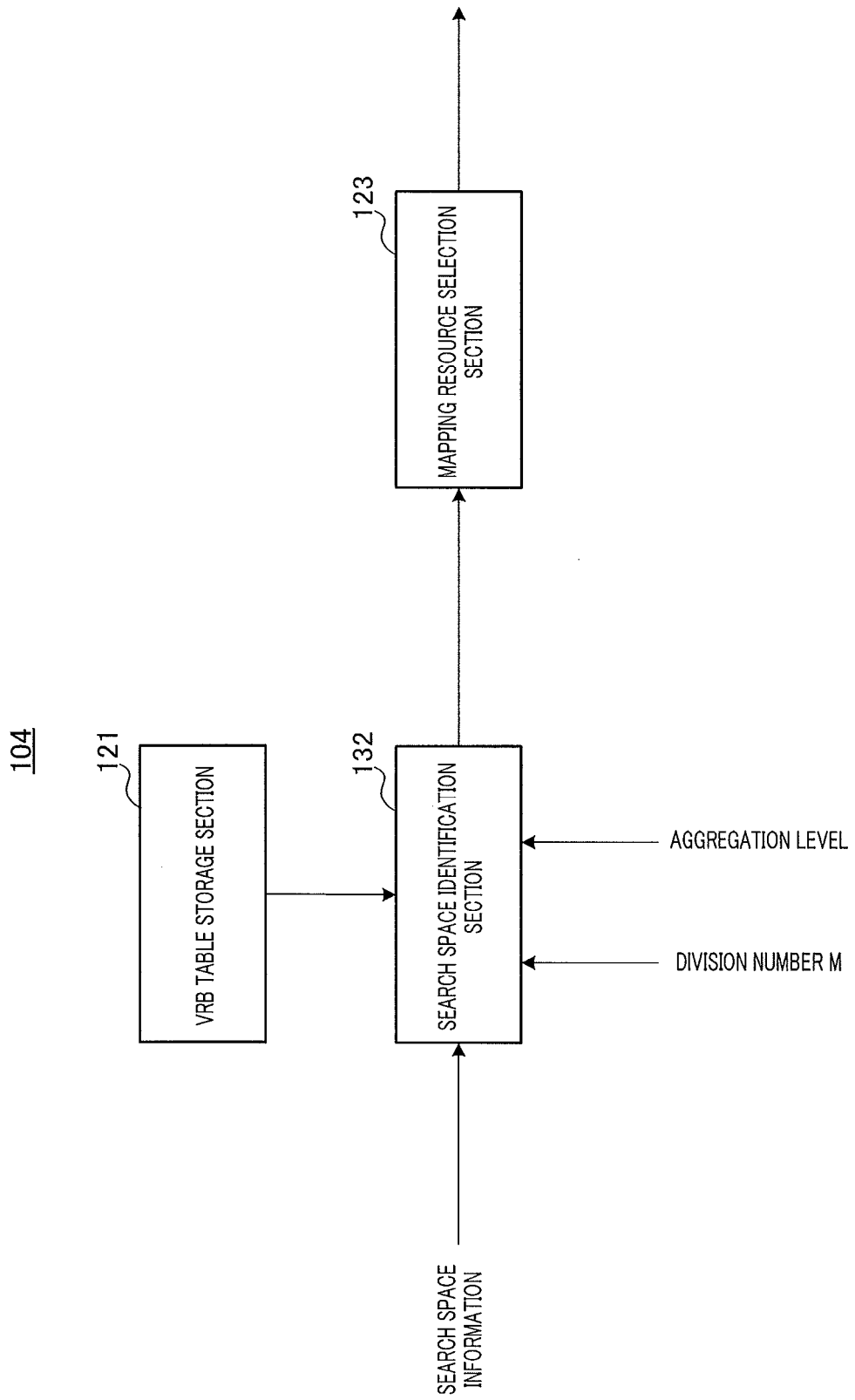
FIG. 15 is a block diagram illustrating a configuration of a control signal mapping control section according to Embodiment 3 of the present invention.

More specifically, control signal mapping control section 104 includes search space identification section 132 as shown in FIG. 15.

Search space identification section 132 identifies a virtual channel CCE group used associated in the VRB table with the pair of the "reference division number" and the aggregation level. Search space identification section 132 identifies a search space of the physical channel corresponding to the pair of the "reference division number" and the aggregation level based on the identified virtual channel CCE group used, the "search space information" and the "first type association rule" corresponding to the pair of the "reference division number" and the aggregation level. Here, when the division number calculated in division number calculation section 103 is 2M, the "reference division number" is M.

Search space identification section 132 identifies a search space of the physical channel corresponding to the division number calculated in division number calculation section 103 based on the search space of the physical channel corresponding to the pair of the "reference division number" and the aggregation level, and the "second type association rule."

Extracted resource identification section 206 in terminal 200 of Embodiment 3 identifies a plurality of "resource region groups to be extracted" (that is, search space) corresponding to the pair of the division number M calculated in division number calculation section 205 and an aggregation level based on the division number M, the search space information transmitted from base station 100 and the aggregation level.

To be more specific, a search space is identified based on the "VRB table," the division number M, "search space information," aggregation level, "first type association rule" and "second type association rule." Here, the "first type association rule" is a rule that associates the "virtual channel resource regions to be extracted" with the "physical channel resource regions to be extracted" regarding the pair of the division number M/2 and aggregation level as in the case of Embodiment 2. On the other hand, the "second type association rule" is a rule that associates the "physical channel resource regions to be extracted" regarding the pair of the division number M/2 and aggregation level with the "physical channel resource regions to be extracted" regarding the pair of the division number M and aggregation level. That is, the "second type association rule" is a rule that associates the "physical channel CCEs" regarding the division number M/2 with the "physical channel CCEs" regarding the division number M in a given PRB pair.

Figure 16:
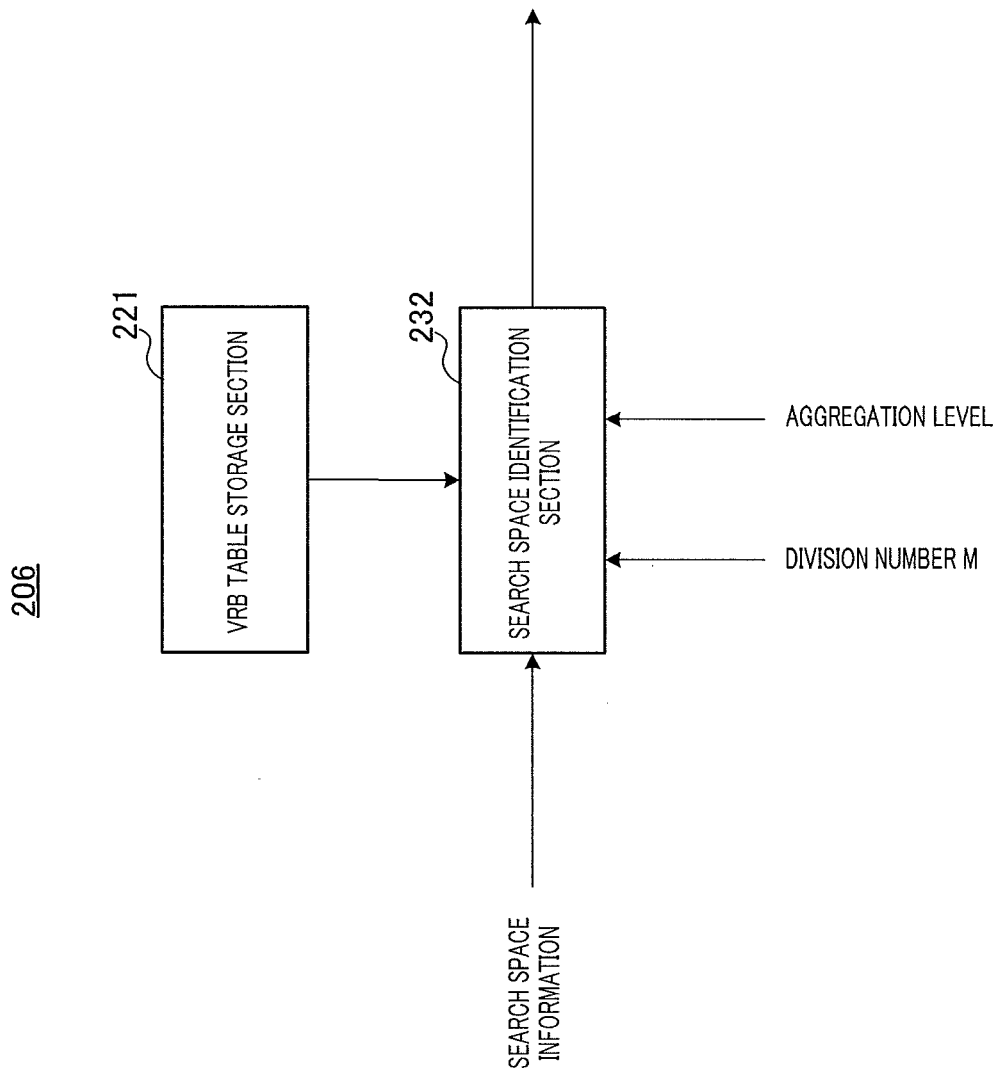
FIG. 16 is a block diagram illustrating a configuration of an extracted resource identification section according to Embodiment 3 of the present invention.

More specifically, extracted resource identification section 206 includes search space identification section 232 as shown in FIG. 16.

Search space identification section 232 identifies a virtual channel CCE group used associated in the VRB table with the pair of the "reference division number," i.e., the division number M and the aggregation level. Search space identification section 232 identifies a search space of the physical channel corresponding to the pair of the "reference division number" and the aggregation level based on the identified virtual channel CCE group used, "search space information" and the "first type association rule" corresponding to the pair of the "reference division number" and the aggregation level.

Search space identification section 232 identifies a search space of the physical channel corresponding to the division number calculated in division number calculation section 205 based on the search space of the physical channel corresponding to the pair of the "reference division number" and the aggregation level, and the "second type association rule."

Figure 17:
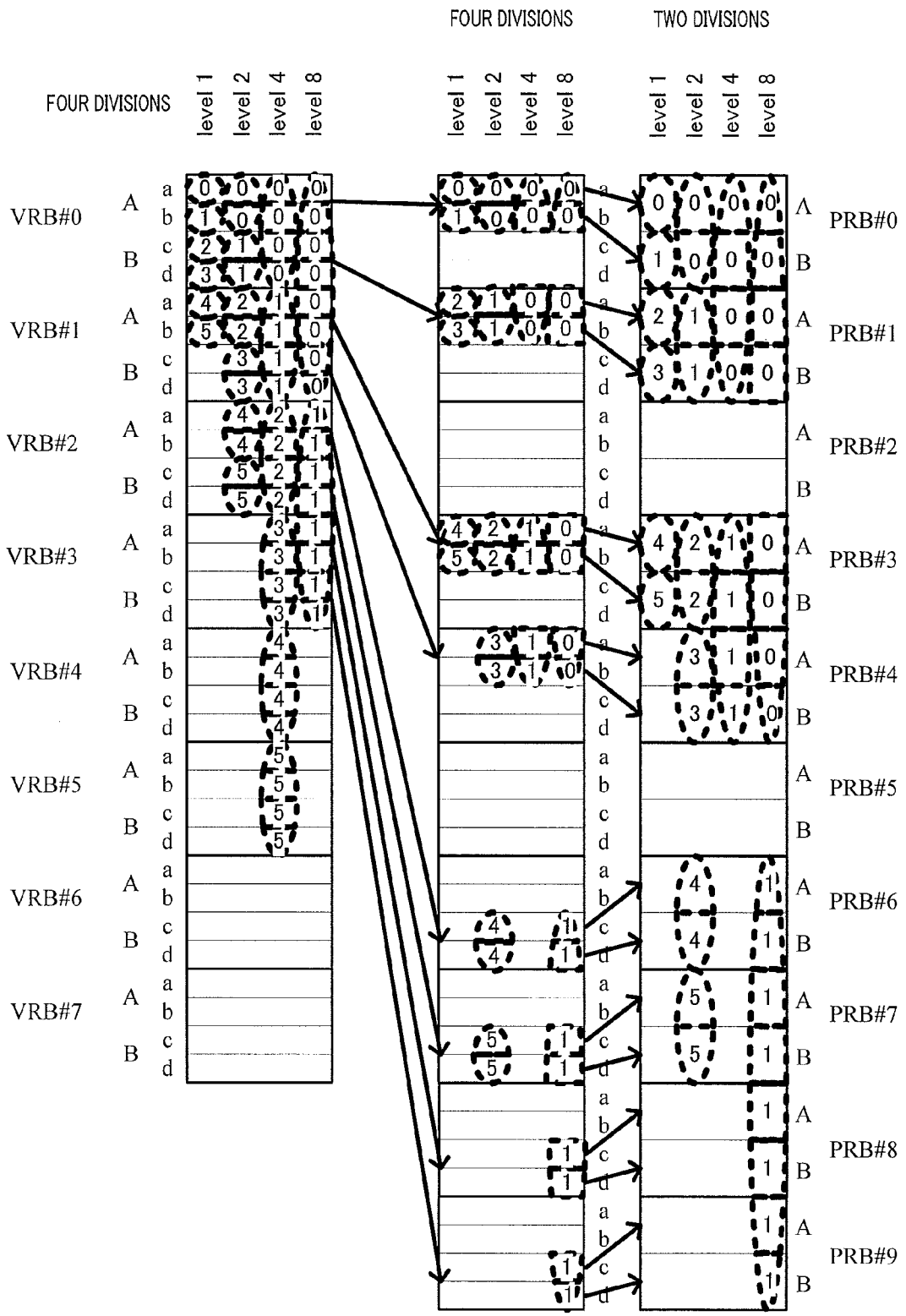
FIG. 17 is a diagram provided for describing the operations of a base station and a terminal according to Embodiment 3 of the present invention.

The operations of base station 100 and terminal 200 configured in the manner described above will be described. Here, in particular, a case will be described as an example where the division number=2 and the division number=4. FIG. 17 is a diagram provided for describing the operations of base station 100 and terminal 200.

The diagram on the left of FIG. 17 visually expresses contents of a "VRB table" when the division number=4.

When the division number=2 calculated in division number calculation section 205, search space identification section 132 identifies a virtual channel CCE group used associated in the VRB table with the pair of the reference division number=4 and the aggregation level using the "VRB table" shown in the diagram on the left of FIG. 17.

Search space identification section 132 identifies a search space of the physical channel corresponding to the pair of the reference division number=4 and the aggregation level based on the identified virtual channel CCE group used, "search space information" and the "first type association rule" corresponding to the pair of the reference division number=4 and the aggregation level. For example, when the division number=4 and the aggregation level=2, as shown in the diagram in the middle of FIG. 17, VRB#0(A), VRB#0(B), VRB#1(A), VRB#1(B), VRB#2(A) and VRB#2(B) are mapped to PRB#0 (A), PRB#1(A), PRB#2(A), PRB#3(A), PRB#4(A) and PRB#4(B) according to the "first type association rule."

Search space identification section 132 then identifies a search space of the physical channel corresponding to the division number calculated in division number calculation section 103 based on the search space of the physical channel corresponding to the pair of the "reference division number" and the aggregation level, and the "second type association rule." Here, according to "second type association rule" in FIG. 17, PRB#X(a) and PRB#X(c) are associated with PRB#X(A), and PRB#X(b) and PRB#X(d) are associated with PRB#X(B). However, PRB#X(a) and PRB#X(c) associated with PRB#X(A) are never used simultaneously as physical channel CCEs used. Similarly, PRB#X(b) and PRB#X(d) associated with PRB#X(B) are never used simultaneously as physical channel CCEs used.

Search space identification section 232 of terminal 200 perform basically the same operation as that of search space identification section 132.

As described above, according to the present embodiment, control signal mapping control section 104 in base station 100 determines a search space by determining a control channel element group forming a plurality of resource region candidates among CCE groups obtained by dividing each PRB pair included in the first group into the same number as the division number. Control signal mapping control section 104 then identifies a second search space in the physical channel when the division number is 2M (M is a natural number) and the value of the aggregation level is 2A (A is a natural number) based on the first search space in the logical channel and the first type association rule when the division number is 2M and the value of the aggregation level is 2A. Control signal mapping control section 104 further identifies a third search space in the physical channel when the division number is M and the value of the aggregation level is A based on the second search space and the second type association rule. The second type association rule associates CCEs when the division number in each PRB pair is 2M with CCEs when the division number is M.

By so doing, even when the division number of a PRB pair varies from one subframe to another, if base station 100 indicates physical resources to terminal 200 for the division number 2M, indication for the division number M is unnecessary, and it is thereby possible to reduce the amount of signaling when base station 100 indicates physical resources to terminal 200. If a PRB pair of good quality is included in the first group in the first subframe, it is possible to continue to use the PRB pair even when the division number varies from one subframe to another.

According to the present embodiment, extracted resource identification section 206 in terminal 200 identifies a search space by identifying a control channel element group forming a plurality of resource region candidates among CCE groups obtained by dividing each PRB pair included in the first group into the same number as the division number. The plurality of resource region candidates forming this identified search space, correspond to the plurality of "resource regions to be extracted." Extracted resource identification section 206 then identifies a second search space in the physical channel when the division number is 2M (M is a natural number) and the value of the aggregation level is 2A (A is a natural number) based on the first search space in the logical channel and the first type association rule when the division number is 2M and the value of the aggregation level is 2A. Furthermore, extracted resource identification section 206 identifies a third search space in the physical channel when the division number is M and the value of the aggregation level is A based on the second search space and the second type association rule. The second type association rule associates CCEs when the division number in each PRB pair is 2M with CCEs when the division number is M.

[Embodiment 4]

As with Embodiment 3, Embodiment 4 relates to a variation of a method for mapping a logical channel (VRB) to a physical channel (PRB). However, the relationship between the calculated division number and the "reference division number" in Embodiment 4 is opposite to the relationship in Embodiment 3. Since basic configurations of a base station and a terminal according to Embodiment 4 are common to those of base station 100 and terminal 200 according to Embodiment 1 and Embodiment 3, they will be described with reference to FIGS. 10, 11, 15 and 16.

In base station 100 of Embodiment 4, search space identification section 132 identifies a virtual channel CCE group used associated in a VRB table with a pair of the "reference division number" and the aggregation level. Search space identification section 132 identifies a search space of the physical channel corresponding to the pair of the "reference division number" and the aggregation level based on the identified virtual channel CCE group used, "search space information" and the "first type association rule" corresponding to the pair of the "reference division number" and the aggregation level. Here, when the division number calculated in division number calculation section 103 is M, the "reference division number" is 2M.

Search space identification section 132 identifies a search space of the physical channel corresponding to the division number calculated in division number calculation section 103 based on the search space of the physical channel corresponding to the pair of the "reference division number" and the aggregation level, and the "second type association rule."

In terminal 200 of Embodiment 4, search space identification section 232 identifies a virtual channel CCE group used associated in a VRB table with the pair of the "reference division number," i.e., the division number M and the aggregation level. Search space identification section 232 then identifies a search space of the physical channel corresponding to the pair of the "reference division number" and the aggregation level based on the identified virtual channel CCE group used, "search space information" and the "first type association rule" corresponding to the pair of the "reference division number" and the aggregation level.

Search space identification section 232 then identifies a search space of the physical channel corresponding to the division number calculated in division number calculation section 205 based on a search space of the physical channel corresponding to the pair of the "reference division number" and the aggregation level, and the "second type association rule."

Figure 18:
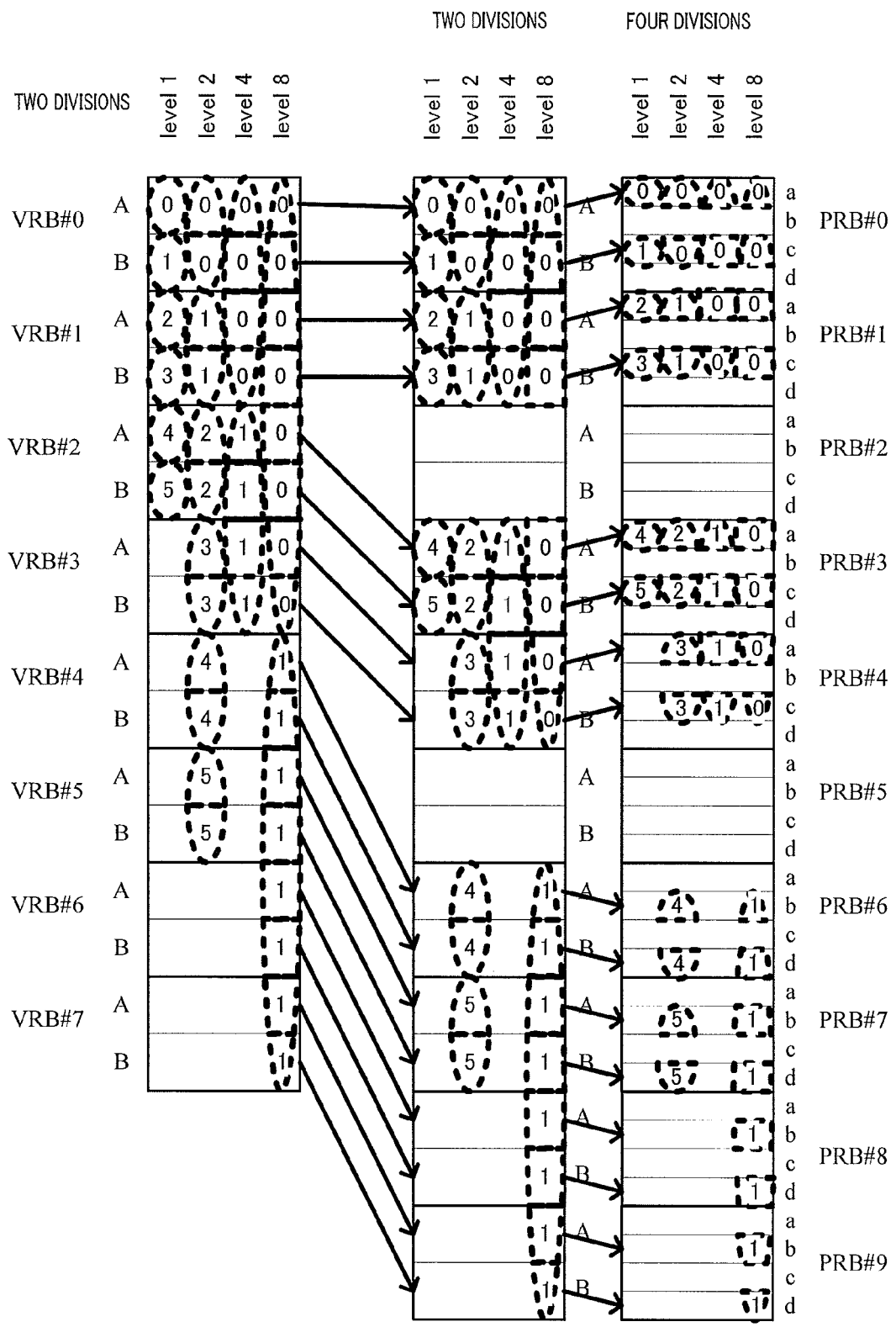
FIG. 18 is a diagram provided for describing the operations of a base station and a terminal according to Embodiment 4 of the present invention.

The operations of base station 100 and terminal 200 configured in the manner described above will be described. Here, in particular, a case will be described as an example where the division number=2 and the division number=4. FIG. 18 is a diagram provided for describing the operations of base station 100 and terminal 200.

When the division number=4 calculated in division number calculation section 205, search space identification section 132 identifies a virtual channel CCE group used associated in the VRB table with the pair of the reference division number=2 and the aggregation level using the "VRB table" shown in the diagram on the left of FIG. 18.

Search space identification section 132 identifies a search space of the physical channel corresponding to the pair of the reference division number=2 and the aggregation level based on the identified virtual channel CCE group used, "search space information" and the "first type association rule" corresponding to the pair of the reference division number=2 and the aggregation level. For example, when the division number=2 and the aggregation level=2, as shown in the diagram in the middle of FIG. 17, VRB#0(A), VRB#0(B), VRB#1(A), VRB#1(B), VRB#2(A), VRB#2(B), VRB#3(A), VRB#3(B), VRB#4(A), VRB#4(B), VRB#5(A) and VRB#5(B) are mapped to PRB#0(A), PRB#0(B), PRB#1(A), PRB#1(B), PRB#3(A), PRB#3(B), PRB#4(A), PRB#4(B), PRB#6(A), PRB#6(B), PRB#7(A) and PRB#7(B) according to the "first type association rule."

Search space identification section 132 then identifies a search space of the physical channel corresponding to the division number calculated in division number calculation section 103 based on a search space of the physical channel corresponding to the pair of the "reference division number" and the aggregation level, and the "second type association rule". The "second type association rule" in FIG. 17 associates PRB#X(A) with PRB#X(a) and associates PRB#X(B) with PRB#X(c) in PRB#0 or the like. On the other hand, the "second type association rule" in FIG. 17 associates PRB#X (A) with PRB#X(b) and associates PRB#X(B) with PRB#X (d) in PRB#6 or the like. That is, the method of association is changed between the first PRB pair and the second PRB pair. However, the "second type association rule" is not limited to this example, and a common method of association may be used between the first PRB pair and the second PRB pair.

Search space identification section 232 of terminal 200 perform basically the same operation as that of search space identification section 132.

As described above, according to the present embodiment, control signal mapping control section 104 in base station 100 determines a search space by determining a control channel element group forming a plurality of resource region candidates among CCE groups obtained by dividing each PRB pair included in the first group into the same number as the division number. Control signal mapping control section 104 identifies a second search space in the physical channel when the division number is M (M is a natural number) and the value of the aggregation level is A (A is a natural number) based on the first search space in the logical channel and the first type association rule when the division number is M and the value of the aggregation level is A. Control signal mapping control section 104 identifies a third search space in the physical channel when the division number is 2M and the value of the aggregation level is 2A based on the second search space and the second type association rule. The second type association rule associates control channel elements when the division number is 2M in each physical channel resource block with control channel elements when the division number is M.

By so doing, even when the division number of a PRB pair varies from one subframe to another, if base station 100 indicates physical resources to terminal 200 for the division number M, indication for the division number 2M becomes unnecessary, and it is thereby possible to reduce the amount of signaling when base station 100 indicates physical resources to terminal 200. Furthermore, if a PRB pair of good quality is included in the first group in the first subframe, it is possible to continue to use the PRB pair even when the division number varies from one subframe to another.

According to the present embodiment, extracted resource identification section 206 in terminal 200 identifies a search space by identifying a control channel element group forming a plurality of resource region candidates among CCE groups obtained by dividing each PRB pair included in the first group into the same number as the division number. The plurality of resource region candidates forming the identified search space, correspond to a plurality of "resource regions to be extracted." Extracted resource identification section 206 identifies a second search space in the physical channel when the division number is M (M is a natural number) and the value of the aggregation level is A (A is a natural number) based on the first search space in the logical channel and the first type association rule when the division number is M and the value of the aggregation level is A. Furthermore, extracted resource identification section 206 identifies a third search space in the physical channel when the division number is 2M and the value of the aggregation level is 2A based on the second search space and the second type association rule. The second type association rule associates control channel elements when the division number is 2M in each physical channel resource block with control channel elements when the division number is M.

[Other Embodiments]

[1] In the above embodiments, the division number may also be determined based on the type of subframe. The following are methods for determining the division number based on the type of subframe.

(1) The division number is made greater in MBSFN subframes than in non-MBSFN subframes. This makes it possible to increase the division number of MBSFN subframes having more REs than non-MBSFN subframes and improve resources utilization efficiency in MBSFN subframes.

(2) The division number is made greater in subframes in which CSI-RS is transmitted than in subframes in which CSI-RS is not transmitted.

(3) The division number is made greater in DL subframes than in special subframes.

(4) The division number is made greater in subframes having a normal CP length than in subframes having an extended CP length.

(5) The division number is made greater in subframes of extension carriers than in subframes of carriers other than extension carriers. The extension carrier is a subframe having no signal regions set for each cell such as CRS, PDCCH, PHICH or PCFICH.

(6) The division number is made greater in subframes whose number of OFDM symbols used for PDCCH is three or four than in subframes whose number of OFDM symbols used for PDCCH is one.

(7) When the cell to which the terminal is connected sets ABS (almost blank subframe), the division number is made smaller in ABS than in non-ABS subframes. Transmitting an ABS with small transmission power so as not to provide interference to other cells causes channel quality of the ABS to degrade. The division number is made smaller in subframes of low channel quality.

(8) When a cell that provides interference to the cell to which the terminal is connected sets ABS (almost blank subframe), the division number is made smaller in non-ABS subframes than ABS. Channel quality increases in subframes set by the other cell as an ABS and channel quality degrades in subframes not set as an ABS. The division number is made smaller in non-ABS subframes of low channel quality. Reducing the division number in subframes whose channel quality degrades allows channel quality of a control signal to improve.

[2] The above embodiments have been described on the assumption that logical channels are mapped continuously, but the present invention is not limited to this assumption, and logical channels may not be mapped continuously.

[3] In the above embodiments, the starting positions of search spaces of the respective aggregation levels are the same, but the present invention is not limited to this case and the starting positions may differ.

[4] The above embodiments have been described on the assumption that search spaces of levels 1, 2, 4 and 8 have six, six, two and two "virtual channel unit resource region candidates" respectively, but the numbers of the candidates are not limited to these numbers. Furthermore, the aggregation level is not limited to this case either.

[5] The above embodiments have been described on the assumption that a PRB pair is divided in the frequency axis direction, but the division direction is not limited to this. That is, the PRB pair may also be divided in the code axis direction or time axis direction.

[6] The above embodiments can be combined.

(1) For example, when the division number is 1 or 2, one of Embodiments 1 to 4 is used. When the division number is 4, Embodiment 4 is used to thereby identify a search space with the division number 4 from a search space with the division number 2.

(2) For example, when the division number is 1 or 2, one of Embodiments 1 to 4 is used. When the division number is 4, Embodiment 2 is used. However, the search space when the division number is 4 and the aggregation level is 1 is obtained by dividing into two the search space when the division number is 4 and the aggregation level is 2.

(3) For example, when the division number is 2 or 4, one of Embodiments 1 to 4 is used. When the division number is 1, Embodiment 3 is used to thereby identify a search space with the division number 1 from a search space with the division number 2. In this case, however, when the division number is 2, PRB pairs are assigned so that one search space per PRB may be assigned.

(4) For example, when the division number is 2 or 4, one of Embodiments 1 to 4 is used. When the division number is 1, Embodiment 2 is used. A search space when the division number is 1 and the aggregation level is 8 may be assumed to be a combination of two search spaces when the division number is 2 and the aggregation level is 8.

[7] The embodiments of the present invention described above are provided as hardware. The present invention can be achieved through software in cooperation with hardware.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of Japanese Patent Application No. 2011-176855, filed on Aug. 12, 2011, including the specification, drawings and abstract, is incorporated herein by reference in its entirety.

INDUSTRIAL APPLICABILITY

The transmitting apparatus, receiving apparatus, transmission method, and reception method of the present invention are useful in improving receiving quality of a control signal.

REFERENCE SIGNS LIST

100 Base station
101 Assignment control information generating section
102 Search space determining section
103, 205 Division number calculation section
104 Control signal mapping control section 105, 208 Error-correction coding section
106, 209 Modulation section
107, 210 Mapping section
108, 211 Transmitting section
109, 201 Receiving section
110, 203 Demodulation section
111, 204 Error-correction decoding section
121, 221 VRB table storage section
122, 132, 222, 232 Search space identification section
123 Mapping resource selection section
200 Terminal
202 Signal demultiplexing section
206 Extracted resource identification section
207 Control signal receiving section

The invention claimed is:

1. A terminal apparatus comprising:
 a division number calculator which, in operation, calculates a division number based on a number of OFDM symbols used for an Enhanced Physical Downlink Control CHannel (EPDCCH), the division number being a number of Control Channel Elements (CCEs) per resource block pair, the EPDCCH being a resource region that is defined in a data region of a subframe and that is configured to transmit either of downlink control information and downlink data, wherein the division number calculator, in operation, calculates the division number such that the division number for a subframe having a Normal cyclic prefix length is larger than the division number for a subframe having an Extended cyclic prefix length;
 a controller which, in operation, uses the division number to specify a plurality of resource region candidates, each resource region candidate including at least one CCE; and
 a decoder which, in operation, decodes the plurality of resource region candidates to obtain the downlink control information.

2. The terminal apparatus according to claim 1, wherein the division number calculator, in operation, calculates the division number such that the division number for a downlink normal subframe is larger than the division number for a special subframe having a gap period for switching between a downlink and an uplink.

3. The terminal apparatus according to claim 1, wherein the resource block pair comprises two slots.

4. The terminal apparatus according to claim 1, wherein each CCE includes a plurality of resource elements.

5. The terminal apparatus according to claim 1, wherein the division number is acquired by dividing a specified number by a number of resource elements included in one CCE.

6. A communication method comprising:
 calculating a division number based on a number of OFDM symbols used for an Enhanced Physical Downlink Control CHannel (EPDCCH), the division number being a number of Control Channel Elements (CCEs) per resource block pair, the EPDCCH being a resource region that is defined in a data region of a subframe and that is configured to transmit either of downlink control information and downlink data, wherein in the calculating of the division number, the division number is calculated such that the division number for a subframe having a Normal cyclic prefix length is larger than the division number for a subframe having an Extended cyclic prefix length;
 using the division number to specify a plurality of resource region candidates, each resource region candidate including at least one CCE; and
 decoding the plurality of resource region candidates to obtain the downlink control information.

7. The communication method according to claim 6, wherein
 in the calculating of the division number, the division number is calculated such that the division number for a downlink normal subframe is larger than the division number for a special subframe having a gap period for switching between a downlink and an uplink.

8. The communication method according to claim 6, wherein
 the resource block pair comprises two slots.

9. The communication method according to claim 6, wherein
 each CCE includes a plurality of resource elements.

10. The communication method according to claim 6, wherein
 the division number is acquired by dividing a specified number by a number of resource elements included in one CCE.

* * * * *